(12) United States Patent
Yamada et al.

(10) Patent No.: US 9,487,098 B2
(45) Date of Patent: Nov. 8, 2016

(54) POWER CONVERSION APPARATUS

(71) Applicant: Panasonic Intellectual Property Management Co., Ltd., Osaka (JP)

(72) Inventors: Goh Yamada, Osaka (JP); Takaaki Norisada, Osaka (JP); Hajime Hida, Osaka (JP); Sohei Okamoto, Osaka (JP); Keiji Akamatsu, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 14/627,832

(22) Filed: Feb. 20, 2015

(65) Prior Publication Data

US 2015/0256089 A1 Sep. 10, 2015

(30) Foreign Application Priority Data

Mar. 4, 2014 (JP) ................................ 2014-041924

(51) Int. Cl.
*H02M 7/48* (2007.01)
*H02M 1/00* (2006.01)
*H02M 3/337* (2006.01)
(Continued)

(52) U.S. Cl.
CPC ........ *B60L 11/1812* (2013.01); *B60L 11/1803* (2013.01); *B60L 11/1816* (2013.01); *B60L 11/1824* (2013.01); *B60L 15/007* (2013.01); *H02M 3/3376* (2013.01); *B60L 2210/12* (2013.01); *B60L 2210/14* (2013.01); *B60L 2230/10* (2013.01); *B60L 2240/526* (2013.01); *B60L 2240/527* (2013.01); *B60L 2240/529* (2013.01); *H02M 2001/0054* (2013.01); *H02M 2007/4811* (2013.01); *Y02T 10/645* (2013.01); *Y02T 10/7005* (2013.01); *Y02T 10/7088* (2013.01); *Y02T 10/7225* (2013.01); *Y02T 10/7233* (2013.01); *Y02T 10/92* (2013.01);
(Continued)

(58) Field of Classification Search
CPC ............... B60L 2240/529; H02M 2001/0054; H02M 2007/4811; H02M 3/3376; Y02T 10/645; Y02T 10/7005; Y02T 10/7088; Y02T 10/7225; Y02T 10/7233; Y02T 10/92; Y02T 90/121; Y02T 90/127
See application file for complete search history.

(56) References Cited

U.S. PATENT DOCUMENTS

| 6,172,882 B1* | 1/2001 | Tanaka | H02M 7/5387 363/132 |
| 2005/0195622 A1* | 9/2005 | Lehman | H02M 3/33569 363/17 |
| 2011/0278953 A1* | 11/2011 | Zhang | H02M 7/538 307/115 |

(Continued)

FOREIGN PATENT DOCUMENTS

| JP | 2004-159419 | 6/2004 |
| JP | 2006-158137 | 6/2006 |

*Primary Examiner* — Jessica Han
*Assistant Examiner* — Bart Iliya
(74) *Attorney, Agent, or Firm* — McDermott Will & Emery LLP

(57) ABSTRACT

A power conversion apparatus according to one aspect of the present disclosure comprises a bridge circuit including a first switch and a second switch, a first auxiliary switch, a first auxiliary inductor, a control device, a transformer, a secondary-side inductor, a rectifier circuit, a smoothing circuit, and an output detection circuit. The control device performs an on/off operation on the first auxiliary switch if a value detected by the output detection circuit is smaller than or equal to a setting value, and maintains the first auxiliary switch in an off state if the detected value exceeds the setting value.

18 Claims, 11 Drawing Sheets

(51) Int. Cl.
  *B60L 11/18* (2006.01)
  *B60L 15/00* (2006.01)
(52) U.S. Cl.
  CPC .............. *Y02T90/121* (2013.01); *Y02T 90/127* (2013.01); *Y02T 90/14* (2013.01)

(56) References Cited

U.S. PATENT DOCUMENTS

2015/0194908 A1\* 7/2015 Wang .................... H02M 7/483
　　　　　　　　　　　　　　　　　　　　363/131

\* cited by examiner

AT LIGHT LOAD

AT HEAVY LOAD

AT LIGHT LOAD

AT HEAVY LOAD

POWER CONVERSION APPARATUS

BACKGROUND

1. Technical Field

The present disclosure relates to power conversion apparatuses.

2. Description of the Related Art

Insulation-type direct current to direct current (DC-DC) converter circuits having soft-switching circuits have been proposed in recent years. In soft-switching circuits, for example, switches are turned on and/or turned off so that the rates of change in voltages applied to the switches decrease. This can reduce switching loss.

Japanese Unexamined Patent Application Publication No. 2004-159419 discloses a technology for passing auxiliary current, required for soft switching, to switches in an inverter. In this technology, the amount of auxiliary current to be supplied is controlled according to the durations of on periods of sub-switches.

SUMMARY

One non-limiting and exemplary embodiment provides a power conversion apparatus that can reliably reduce power loss.

A power conversion apparatus according to one aspect of the present disclosure includes: a bridge circuit that converts an input direct-current (DC) voltage into a first alternating-current (AC) voltage, the bridge circuit including a first switch, a second switch connected in series with the first switch, a first capacitor connected in parallel with the first switch, and a second capacitor connected in parallel with the second switch; a first auxiliary switch including a first end connected to a first node between the first switch and the second switch; a first auxiliary inductor connected to a second end of the first auxiliary switch; a control device that controls on and off of the first switch, the second switch, and the first auxiliary switch; a transformer that converts the first AC voltage into a second AC voltage, the transformer including a primary winding connected to the bridge circuit and a secondary winding electromagnetically coupled with the primary winding; a secondary-side inductor including a first end connected to the secondary winding; a rectifier circuit that rectifies the second AC voltage to generate a rectified voltage, the rectifier circuit connected to a second end of the secondary-side inductor; a smoothing circuit smooths the rectified voltage to generate an output voltage and an output current, the smoothing circuit connected to the rectifier circuit; and an output detection circuit that detects a value according to at least one of the output voltage and the output current. If the detected value is smaller than or equal to a predetermined setting value, the control device puts the first auxiliary switch into an on state in a first period from when the first switch is turned off until the second switch is turned on and puts the first auxiliary switch into an off state in a second period in which the first switch or the second switch is put into an on state. If the detected value of the output detection circuit exceeds the setting value, the control device maintains the first auxiliary switch in the off state.

It should be noted that comprehensive or specific embodiments may be implemented as a control device, a control method, a power conversion apparatus, a switching system, an electricity storage system, a charger, a vehicle, or any selective combination thereof.

The power conversion apparatus according to one aspect of the present disclosure makes it possible to reliably reduce power loss.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

A description will be given of findings underlying the present disclosure. The description below is to help understand the present disclosure and is not intended to limit the present disclosure.

The present inventors have considered a power conversion apparatus that can reduce power loss by varying a period in which auxiliary resonance current is supplied. A power conversion apparatus in an example considered includes a full-bridge circuit, an auxiliary switch, an auxiliary inductor, and a control device. The auxiliary switch switches an electrical connection between the full-bridge circuit and the auxiliary inductor in accordance with an input from the control device. The control device turns on the auxiliary switch, for example, at a timing at which two switches included in an arm of the full-bridge circuit are both put into an OFF state. When the auxiliary switch is turned on, the auxiliary inductor causes resonance current to be generated and supplies the resonance current to the full-bridge circuit. The full-bridge circuit uses the resonance current to realize soft switching control. The control device controls a period Δt in which the auxiliary switch is in the ON state to thereby optimize the amount of resonance current. This reduces loss due to flow of the resonance current through the auxiliary inductor.

The power conversion apparatus in the example considered has the following problems.

Figure 13A:
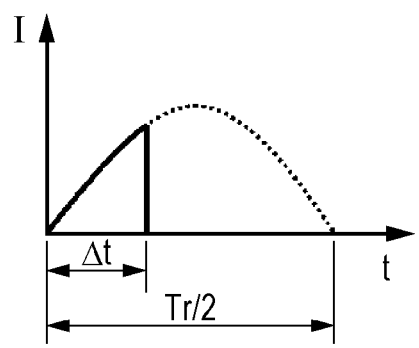
FIGS. 13A to 13D are graphs schematically illustrating waveforms of resonance current in a power conversion apparatus in an example considered.
Figure 13B:
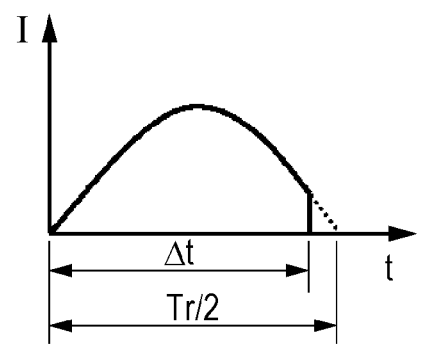
Figure 13C:
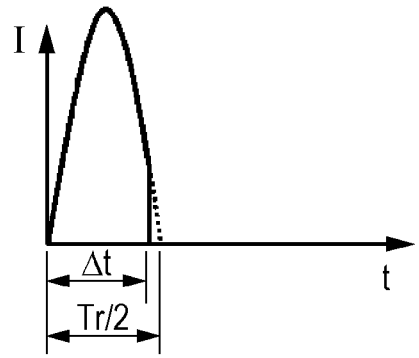
Figure 13D:
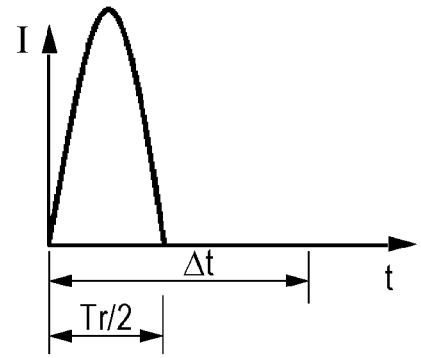

FIG. 13A illustrates a waveform when the on period Δt of an auxiliary switch is set to be short in a resonant circuit in which a resonance cycle Tr is designed to be long. FIG. 13B illustrates a waveform when the on period Δt is set to be long in the resonant circuit in which a resonance cycle Tr is designed to be long. FIG. 13C illustrates a waveform when the on period Δt of an auxiliary switch is set to be short in a resonant circuit in which the resonance cycle Tr is designed to be short. FIG. 13D illustrates a waveform when the on period Δt is set to be long in the resonant circuit in which the resonance cycle Tr is designed to be short. In FIGS. 13A to 13D, the dashed lines indicate the waveforms of resonance current that can be passed to the resonant circuit, and the solid lines indicate the waveforms of resonance current that actually flows to the resonant circuit in the on period Δt of the auxiliary switch.

The peak value of the resonance current may vary because of characteristic variations in elements, such as the auxiliary inductor. In this case, when the auxiliary switch is turned off in the middle of rising of the resonance current (see FIG. 13A), the amount of resonance current to be supplied is greatly influenced by characteristic variations in the elements. Consequently, soft switching may be not performed because of shortage of the resonance current, and a large loss may occur.

On the other hand, in the resonant circuit in which the resonance cycle Tr is designed to be short, the resonance current rises in a short time, thus making it possible to reduce the influence due to characteristic variations in the elements (see FIG. 13C). However, in the resonant circuit in which the resonance cycle Tr is designed to be short, the resonance current falls earlier. Thus, even when the on period Δt of the auxiliary switch is increased, the resonance current cannot be increased (see FIG. 13D). Consequently, soft switching may be not performed because of shortage of the resonance current, and a large loss may occur.

In short, even when the resonance cycle of the resonant circuit is designed to be long or short, there is the possibility that an effect of loss reduction may be not obtained.

In order to address the foregoing, it is conceivable to perform design so that the resonance cycle Tr also varies in accordance with the on period Δt of the auxiliary switch. One example of a conceivable circuit is a circuit having the auxiliary inductor and capacitors whose characteristics are variable. Another conceivable circuit is a circuit in which a voltage supplied to the resonant circuit is made variable. With these methods, however, the circuit configuration is complicated, and the cost increases.

On the basis of the foregoing findings, the present inventors considered a power conversion apparatus that can reliably reduce power loss by using a simple circuit configuration, and have made this disclosure.

OVERVIEW OF EMBODIMENTS

A power conversion apparatus according to one aspect of the present disclosure includes: for example, a bridge circuit that converts an input DC voltage into a first AC voltage, the bridge circuit including a first switch, a second switch connected in series with the first switch, a first capacitor connected in parallel with the first switch, and a second capacitor connected in parallel with the second switch; a first auxiliary switch including a first end connected to a first node between the first switch and the second switch; a first auxiliary inductor connected to a second end of the first auxiliary switch; a control device that controls on and off of the first switch, the second switch, and the first auxiliary switch; a transformer that converts the first AC voltage into a second AC voltage, the transformer including a primary winding connected to the bridge circuit and a secondary winding electromagnetically coupled with the primary winding; a secondary-side inductor including a first end connected to the secondary winding; a rectifier circuit that rectifies the second AC voltage to generate a rectified voltage, the rectifier circuit connected to a second end of the secondary-side inductor; a smoothing circuit that smooths the rectified voltage to generate an output voltage and an output current, the smoothing circuit connected to the rectifier circuit; and an output detection circuit that detects a value according to at least one of the output voltage and the output current. For example, If the detected value is smaller than or equal to a predetermined setting value, the control device puts the first auxiliary switch into an ON state in a first period from when the first switch is turned off until the second switch is turned on and puts the first auxiliary switch into an OFF state in a second period in which the first switch or the second switch is put into an ON state. For example, if the detected value exceeds the setting value, the control device maintains the first auxiliary switch in the OFF state.

According to this configuration, resonance current due to the first auxiliary inductor is stably supplied to each capacitor in accordance with the magnitude of the detected value. This can reduce switching loss and can reduce loss due to excessive resonance current.

The first switch may be any of the plurality of switches included in the bridge circuit and is not limited to a particular switch described below in detail. The first switch may also be, for example, any of the switches indicated by S1 to S4 in the description given below. The same also applies to the second switch. A temporal order of "a first period" and "a second period" is not limited to a particular one. For example, the first period may be temporally prior to the second period, or may be temporally posterior to the second period. Similarly, a temporal order of "a third period" to "a sixth period", described later, is not limited to a particular one.

In the power conversion apparatus according to one aspect of the present disclosure, for example, the bridge circuit may include: a first arm including the first switch, the second switch, the first capacitor, and the second capacitor; and a second arm including a third switch, a fourth switch connected in series with the third switch, a third capacitor connected in parallel with the third switch, and a fourth capacitor connected in parallel with the fourth switch. The power conversion apparatus may further include: for example, a second auxiliary switch including a first end connected to a second node between the third switch and the fourth switch; and a second auxiliary inductor connected to a second end of the second auxiliary switch. For example, the control device may further control on and off of the third switch, the fourth switch, and the second auxiliary switch. For example, if the detected value is smaller than or equal to the setting value, the control device may put the second auxiliary switch into an ON state in a third period from when the third switch is turned off until the fourth switch is turned on and may put the second auxiliary switch into an OFF state in a fourth period in which the third switch or the fourth switch is put into an ON state; and. For example, if the detected value exceeds the setting value, the control device may maintain the second auxiliary switch in the OFF state.

According to this configuration, in accordance with the magnitude of the detected value, the resonance current due to the first auxiliary inductor and the second auxiliary inductor can be reliably supplied to each capacitor. This can reduce switching loss and can reduce loss due to excessive resonance current.

The power conversion apparatus according to one aspect of the present disclosure may further include: for example, a voltage source that supplies the DC voltage to the bridge circuit; a third auxiliary switch connected between the voltage source and the first auxiliary inductor; and a fourth auxiliary switch connected between the voltage source and the second auxiliary inductor. For example, the control device may further control on and off of the third auxiliary switch and the fourth auxiliary switch. For example, if the detected value is smaller than or equal to the setting value, the control device may put the third auxiliary switch into an ON state in a period from when the second switch is turned off until the first switch is turned on, may put the third auxiliary switch into an OFF state in a period in which the first switch or the second switch is put into the ON state, may put the fourth auxiliary switch into an ON state in a period from when the fourth switch is turned off until the third switch is turned on, and may put the fourth auxiliary switch into an OFF state in a period in which the third switch or the fourth switch is put into the ON state. For example, if the detected value exceeds the setting value, the control device may maintain the third auxiliary switch and the fourth auxiliary switch in the OFF state.

According to this configuration, in accordance with the magnitude of the detected value, the resonance current due to the first auxiliary inductor and the second auxiliary inductor can be reliably supplied to each capacitor. This can reduce switching loss and can reduce loss due to excessive resonance current.

The voltage source may individually have a first voltage source that supplies a DC voltage to the first auxiliary inductor and a second voltage source that supplies a DC voltage to the second auxiliary inductor, for example.

The power conversion apparatus according to one aspect of the present disclosure may further include: for example, a voltage source that supplies the DC voltage to the bridge circuit; and a third auxiliary switch connected between the voltage source and the first auxiliary inductor. For example, the second auxiliary inductor may be connected between the second auxiliary switch and the third auxiliary switch. For example, the control device may further control on and off of the third auxiliary switch. For example, if the detected value is smaller than or equal to the setting value, the control device may put the third auxiliary switch into the ON state in a period from when the second switch is turned off until the first switch is turned on and in a fifth period from when the fourth switch is turned off until the third switch is turned on and may put the third auxiliary switch into the OFF state in a sixth period in which the first switch or the second switch is put into the ON state and the third switch or the fourth switch is put into the ON state. For example, if the detected value exceeds the setting value, the control device may maintain the third auxiliary switch in the OFF state.

According to this configuration, in accordance with the magnitude of the detected value, the resonance current due to the first auxiliary inductor and the second auxiliary inductor can be reliably supplied to each capacitor. This can reduce switching loss and can reduce loss due to excessive resonance current. Furthermore, the switch for supplying a DC voltage to the first auxiliary inductor and a switch for supplying a DC voltage to the second auxiliary inductor are integrated as the third auxiliary switch. This can reduce the number of switches and can reduce the circuit scale. The reduction in the number of switches, for example, can reduce the circuit scale of the control device.

In the power conversion apparatus according to one aspect of the present disclosure, for example, the voltage source may include a first voltage-source capacitor and a second voltage-source capacitor connected in series with the first voltage-source capacitor. For example, the third auxiliary switch may be connected to an intermediate node between the first voltage-source capacitor and the second voltage-source capacitor. Alternatively, for example, the third auxiliary switch and the fourth auxiliary switch may be connected to an intermediate node between the first voltage-source capacitor and the second voltage-source capacitor.

With this arrangement, a DC voltage can be supplied from the intermediate node via the third auxiliary switch and/or the fourth auxiliary switch. This DC voltage can cause resonance current to be generated in the first auxiliary inductor and the second auxiliary inductor. As a result, loss in the power conversion apparatus can be reliably reduced.

In the power conversion apparatus according to one aspect of the present disclosure, for example, the first auxiliary switch is a first bidirectional switch. For example, if the detected value is smaller than or equal to the predetermined setting value, the control device may put one of two gates of the first bidirectional switch into an ON state in the first period, may put the other of the two gates of the first bidirectional switch into an ON state in a third period from when the second switch is turned off until the first switch is turned on, and may put the two gates of the first bidirectional switch into an OFF state in the second period.

In the power conversion apparatus according to one aspect of the present disclosure, for example, the bridge circuit includes: a first arm including the first switch, the second switch, the first capacitor, and the second capacitor, and a second arm including a third switch, a fourth switch connected in series with the third switch, a third capacitor connected in parallel with the third switch, and a fourth capacitor connected in parallel with the fourth switch. The power conversion apparatus further includes: for example, a second bidirectional switch including a first end connected to a second node between the third switch and the fourth switch and a second auxiliary inductor connected to a second end of the second auxiliary switch. For example, the control device further controls on and off of the third switch, the fourth switch, and the second bidirectional switch. For example, if the detected value is smaller than or equal to the setting value, the control device may put one of two gates of the second bidirectional switch into an ON state in a fourth period from when the third switch is turned off until the fourth switch is turned on, and may put the other of the two gates of the second bidirectional switch into the ON state in a fifth period from when the fourth switch is turned off until the third switch is turned on.

In the power conversion apparatus according to one aspect of the present disclosure, for example, at least the first auxiliary inductor, the first capacitor, and the second capacitor may cause resonance current flowing therethrough to be generated in the first period. They may not cause the resonance current to be generated in the second period. For example, the secondary-side inductor may accumulate energy when current flows therethrough, and then may cause resonance current flowing through the first capacitor and the second capacitor to be generated using the energy in a period in which the first switch and the second switch are in the off state.

With this arrangement, resonance current can be supplied from the secondary-side inductor in the period in which the first switch and the second switch are in the OFF state. Additionally, in accordance with the magnitude of the detected value, resonance current can also be selectively supplied from the first auxiliary inductor. As a result, switching loss can be reliably reduced, and loss due to excessive resonance current can be reduced.

In the power conversion apparatus according to one aspect of the present disclosure, for example, a reference terminal of the first switch and a reference terminal of the first auxiliary switch may have equal potentials. For example, a reference terminal of the third switch and a reference terminal of the second auxiliary switch may have equal potentials. For example, a reference terminal of the second switch and a reference terminal of the fourth switch may have equal potentials. For example, a reference terminal of the third auxiliary switch and a reference terminal of the fourth auxiliary switch may have equal potentials.

When the reference terminals of the plurality of switches have equal potentials, the DC voltage in the control device can be shared, and the circuit scale of the control device can be reduced.

In the power conversion apparatus according to one aspect of the present disclosure, for example, the first switch, the second switch, the third switch, the fourth switch, the first auxiliary switch, the second auxiliary switch, the third auxiliary switch, and the fourth auxiliary switch may be insulated gate bipolar transistors (IGBTs) or metal oxide semiconductor field effect transistors (MOSFETs).

When each switch is an IGBT, the reference terminal is an emitter terminal. Alternatively, when each switch is a MOSFET, the reference terminal is a source terminal.

In the power conversion apparatus according to one aspect of the present disclosure, for example, the control device may control on and off of the first switch, the second switch, the third switch, and the fourth switch by phase shift control.

A power conversion apparatus according to one aspect of the present disclosure includes: for example, a bridge circuit that includes a first arm including a first switch, a second switch connected in series with the first switch, a first capacitor connected in parallel with the first switch, and a second capacitor connected in parallel with the second switch, and a second arm including a third switch, a fourth switch connected in series with the third switch, a third capacitor connected in parallel with the third switch, and a fourth capacitor connected in parallel with the fourth switch; a voltage source that supplies a DC voltage to the bridge circuit; a first bidirectional switch disposed in a current path extending between the voltage source and a first node between the first switch and the second switch, the first bidirectional switch including at least one switch; a first auxiliary inductor disposed in the current path extending between the voltage source and the first node between the first switch and the second switch, the first auxiliary inductor connected in series with the at least one switch included in the first bidirectional switch; a second bidirectional switch disposed in a current path extending between the voltage source and a second node between the third switch and the fourth switch, the second bidirectional switch including at least one switch; a second auxiliary inductor disposed in the current path extending between the voltage source and the second node between the third switch and the fourth switch, the second auxiliary inductor connected in series with the at least one switch included in the second bidirectional switch; a control device that controls on and off of the first switch, the second switch, the third switch, the fourth switch, the first bidirectional switch, and the second bidirectional switch; a transformer that converts a first AC voltage into a second AC voltage, the transformer including a primary winding connected to the bridge circuit and a secondary winding electromagnetically coupled with the primary winding; a secondary-side inductor including a first end connected to the secondary winding; a rectifier circuit that rectifies the second AC voltage to generate a rectified voltage, the rectifier circuit connected to a second end of the secondary-side inductor; a smoothing circuit that smooths the rectified voltage to generate an output voltage and an output current, the smoothing circuit connected to the rectifier circuit; and an output detection circuit that detects a value according to at least one of the output voltage and the output current. For example, if the detected value is smaller than or equal to a predetermined setting value, the control device puts the first bidirectional switch into an ON state in a first period in which the first switch and the second switch are in an OFF state, puts the first bidirectional switch into an OFF state in a second period in which the first switch or the second switch is in an ON state, puts the second bidirectional switch into an ON state in a third period in which the third switch and the fourth switch are in an OFF state, and puts the second bidirectional switch into an OFF state in a fourth period in which the third switch or the fourth switch is in an ON state. For example, if the detected value exceeds the setting value, the control device maintains at least one of the first bidirectional switch and the second bidirectional switch in the OFF state.

A power conversion apparatus according to one aspect of the present disclosure includes; for example, a bridge circuit including a first arm including a first switch, a second switch connected in series with the first switch, a first capacitor connected in parallel with the first switch, and a second capacitor connected in parallel with the second switch, and a second arm including a third switch, a fourth switch connected in series with the third switch, a third capacitor connected in parallel with the third switch, and a fourth capacitor connected in parallel with the fourth switch; a voltage source that supplies a DC voltage to the bridge circuit; a first auxiliary switch including a first end connected to a first node between the first switch and the second switch; a first auxiliary inductor connected to a second end of the first auxiliary switch; a second auxiliary switch including a first end connected to a second node between the third switch and the fourth switch; a second auxiliary inductor connected to a second end of the second auxiliary switch; a third auxiliary switch connected between the voltage source and a node between the first auxiliary inductor and the second auxiliary inductor, a control device that controls on and off of the first switch, the second switch, the third switch, the fourth switch, the first auxiliary switch, the second auxiliary switch, and the third auxiliary switch; a transformer that converts a first AC voltage into a second AC voltage, the transformer including a primary winding connected to the bridge circuit and a secondary winding electromagnetically coupled with the primary winding; a secondary-side inductor including a first end connected to the secondary winding; a rectifier circuit that rectifies the second AC voltage to generate a rectified voltage, the rectifier circuit connected to a second end of the secondary-side inductor; a smoothing circuit that smooths the rectified voltage to generate an output voltage and an output current, the smoothing circuit connected to the rectifier circuit; and an output detection circuit that detects a value according to at least one of the output voltage and the output current. For example, if the detected value is smaller than or equal to a predetermined setting value, the control device puts the first auxiliary switch or the third auxiliary switch into an ON state in a first period in which the first switch and the second switch are in an OFF state, puts the first auxiliary switch and the third auxiliary switch into an OFF state in a second period in which the first switch or the second switch is in an ON state, puts the second auxiliary switch or the third auxiliary switch into an ON state in a third period in which the third switch and the fourth switch are in an OFF state, and puts the second auxiliary switch and the third auxiliary switch into an OFF state in a fourth period in which the third switch or the fourth switch is in an ON state. For example, if the detected value exceeds the setting value, the control device maintains at least one of the first auxiliary switch, the second auxiliary switch, and the third auxiliary switch in the OFF state.

In the present disclosure, the expression "the control device puts a switch into state B in period A" includes an operation in which the control device puts the switch into state B in at least part of period A and an operation in which the control device puts the switch into state B in a period including period A.

Embodiments will be described below in detail with reference to the accompanying drawings.

The embodiments described below all represent comprehensive or specific examples. Numerical values, shapes, waveforms, materials, constituent elements, the arrangement, positions, and connections of the constituent elements, steps, an order of the steps, and so on described in the embodiments below are merely examples, and are not intended to limit the present disclosure. Of the constituent elements in the embodiments described below, the constituent elements not set forth in the independent claims that represent the broadest concept will be described as optional constituent elements.

The terms, such as "upper" and "lower", that represent directions are merely intended to clarify the description. These terms, therefore, should not be construed as being limiting. In all of the accompanying drawings, the same or corresponding portions are denoted by the same reference numerals, and redundant descriptions may be omitted.

First Embodiment

Configuration of Power Conversion Apparatus 100

Figure 1:
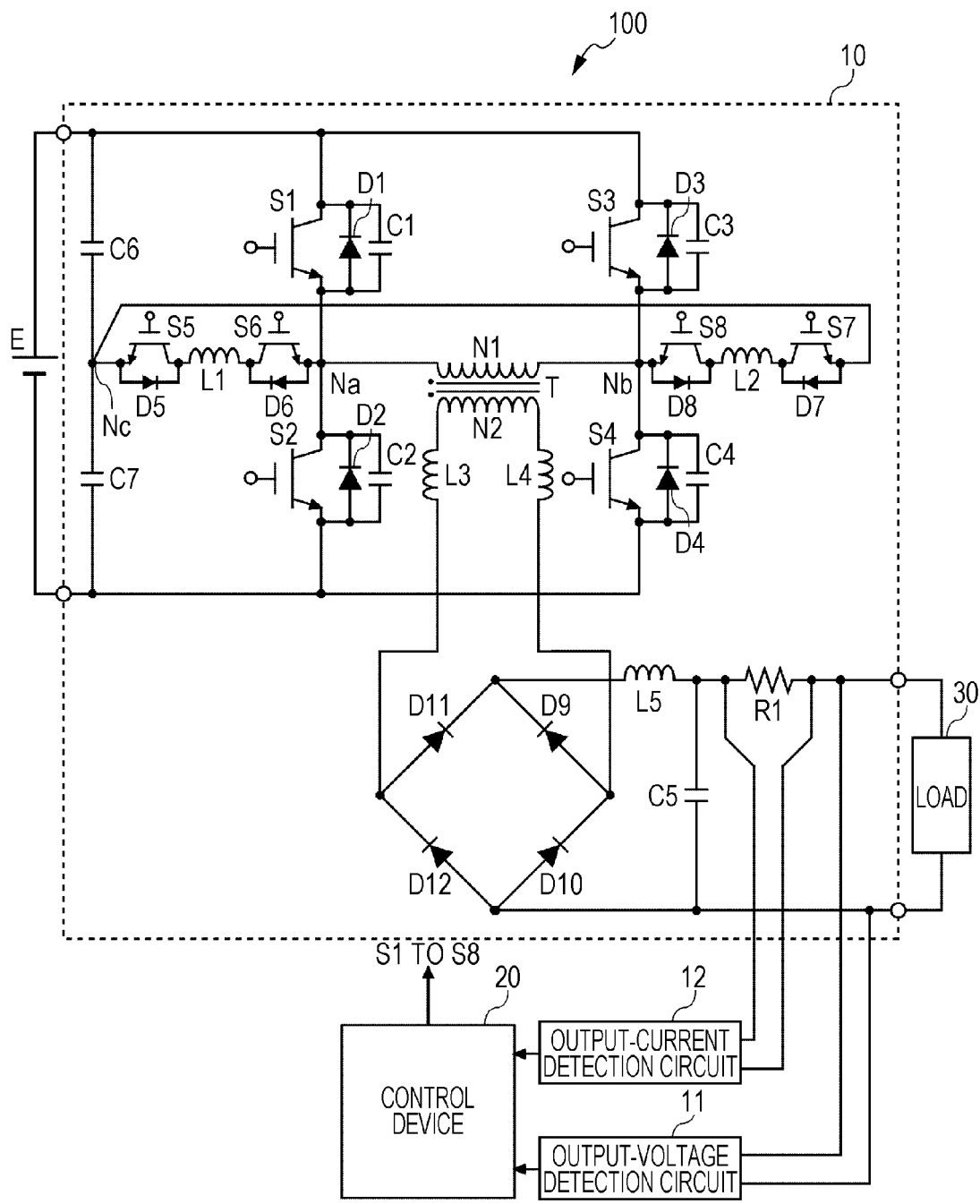
FIG. 1 is a diagram schematically illustrating an example configuration of a power conversion apparatus according to a first embodiment.

FIG. 1 is a diagram illustrating one example of the configuration of a power conversion apparatus 100 according to a first embodiment. The power conversion apparatus 100 includes a switching power-supply device 10, an output-voltage detection circuit 11, an output-current detection circuit 12, and a control device 20. The switching power-supply device 10 is an insulation-type DC-DC converter that employs a phase shift system. The switching power-supply device 10 includes a full-bridge circuit, a first auxiliary inductor L1, a second auxiliary inductor L2, a third inductor L3, a fourth inductor L4, a sixth capacitor C6, a seventh capacitor C7, a fifth auxiliary switch S5, a sixth auxiliary switch S6, a seventh auxiliary switch S7, an eighth auxiliary switch S8, a transformer T, a rectifier circuit, a smoothing circuit, and an output resistor R1.

The full-bridge circuit is an inverter that converts a DC voltage, supplied from a DC power supply E, into an AC voltage. The full-bridge circuit includes a first switch S1, a second switch S2, a third switch S3, and a fourth switch S4, which are connected in a full-bridge configuration. For example, the full-bridge circuit is constituted by a first arm including the first switch S1 at an upper side and the second switch S2 at a lower side and a second arm including the third switch S3 at the upper side and the fourth switch S4 at the lower side. The first arm and the second arm are connected in parallel.

In the example illustrated in FIG. 1, the full-bridge circuit includes a first capacitor C1 connected in parallel with the first switch S1, a second capacitor C2 connected in parallel with the second switch S2, a third capacitor C3 connected in parallel with the third switch S3, and a fourth capacitor C4 connected in parallel with the fourth switch S4. In the example illustrated in FIG. 1, the full-bridge circuit further includes a first diode D1 connected in parallel with the first switch S1, a second diode D2 connected in parallel with the second switch S2, a third diode D3 connected in parallel with the third switch S3, and a fourth diode D4 connected in parallel with the fourth switch S4.

The first to fourth diodes D1 to D4 are connected in reverse bias with the first to fourth switches S1 to S4, respectively. The first to fourth capacitors C1 to C4 are, for example, lossless snubber capacitors. The first to fourth switches S1 to S4 are, for example, semiconductor switches, such as MOSFETs or IGBTs.

In the example illustrated in FIG. 1, the first to fourth switches S1 to S4 are n-channel IGBTs. In this case, a collector terminal of the first switch S1 is connected to a high-potential-side reference line of the DC power supply E. An emitter terminal of the first switch S1 is connected to a collector terminal of the second switch S2. An emitter terminal of the second switch S2 is connected to a low-potential-side reference line of the DC power supply E. A collector terminal of the third switch S3 is connected to the high-potential-side reference line of the DC power supply E. An emitter terminal of the third switch S3 is connected to a collector terminal of the fourth switch S4. An emitter terminal of the fourth switch S4 is connected to the low-potential-side reference line of the DC power supply E. When the first to fourth switches S1 to S4 are MOSFETs, the emitter can instead be read as a source, and the collector can instead be read as a drain.

The primary-side circuit illustrated in FIG. 1 is a partial-resonance-type full-bridge circuit. The partial-resonance-type full-bridge circuit performs commutation by utilizing a resonance operation only in dead time of the first arm and dead time of the second arm, and operates without resonance in other periods. The "dead time of the first arm" refers to a period in which the first switch S1 and the second switch S2 are both in an OFF state. The "dead time of the second arm" refers to a period in which the third switch S3 and the fourth switch S4 are both in an OFF state. The primary-side circuit illustrated in FIG. 1 has a resonant-pole configuration. The sixth capacitor C6 and the seventh capacitor C7 are connected in series with each other, and this series circuit is connected in parallel with the DC power supply E to divide a voltage of the DC power supply E. In the example illustrated in FIG. 1, a voltage divided by the sixth capacitor C6 and a voltage divided by the seventh capacitor C7 each correspond to an intermediate voltage of the DC power supply E. The sixth capacitor C6 and the seventh capacitor C7 smooth the potentials of the high-potential-side reference line of the DC power supply E, the low-potential-side reference line of the DC power supply E, and an intermediate potential line of the DC power supply E.

The sixth capacitor C6 is one example of a first voltage-source capacitor in the present disclosure. The seventh capacitor C7 is one example of a second voltage-source capacitor in the present disclosure. Characteristics of the sixth capacitor C6 and the seventh capacitor C7 may be the same or may be different from each other. That is, a voltage supplied from an intermediate node between the sixth capacitor C6 and the seventh capacitor C7 may be one-half of the voltage of the DC power supply E or may have another value.

A node between the first switch S1 and the second switch S2 is referred to as a "first node Na". A node between the third switch S3 and the fourth switch S4 is referred to as a "second node Nb". The intermediate node between the sixth capacitor C6 and the seventh capacitor C7 is referred to as an "intermediate node Nc".

The first auxiliary inductor L1 is connected between the intermediate node Nc and the first node Na. The second auxiliary inductor L2 is connected between the intermediate node Nc and the second node Nb.

The fifth auxiliary switch S5 is connected between the intermediate node Nc and a first end of the first auxiliary inductor L1. For example, an emitter terminal of the fifth auxiliary switch S5 is connected to the intermediate node Nc, and a collector terminal of the fifth auxiliary switch S5 is connected to the first end of the first auxiliary inductor L1. The sixth auxiliary switch S6 is connected between a second end of the first auxiliary inductor L1 and the first node Na. For example, an emitter terminal of the sixth auxiliary switch S6 is connected to the first node Na, and a collector terminal of the sixth auxiliary switch S6 is connected to the second end of the first auxiliary inductor L1. The fifth auxiliary switch S5 and the sixth auxiliary switch S6, which are connected in series via the first auxiliary inductor L1, serve as a bidirectional switch.

The seventh auxiliary switch S7 is connected between the intermediate node Nc and a first end of the second auxiliary inductor L2. For example, an emitter terminal of the seventh auxiliary switch S7 is connected to the intermediate node Nc, and a collector terminal of the seventh auxiliary switch S7 is connected to the first end of the second auxiliary inductor L2. The eighth auxiliary switch S8 is connected between a second end of the second auxiliary inductor L2 and the second node Nb. For example, an emitter terminal of the eighth auxiliary switch S8 is connected to the second node Nb, and a collector terminal of the eighth auxiliary switch S8 is connected to the second end of the second auxiliary inductor L2. The seventh auxiliary switch S7 and the eighth auxiliary switch S8, which are connected in series via the second auxiliary inductor L2, serve as a bidirectional switch.

A fifth diode D5 is connected in reverse bias with the fifth auxiliary switch S5. A sixth diode D6 is connected in reverse bias with the sixth auxiliary switch S6. A seventh diode D7 is connected in reverse bias with the seventh auxiliary switch S7. An eighth diode D8 is connected in reverse bias with the eighth auxiliary switch S8.

Each of the auxiliary switches S5 to S8 may be, for example, a semiconductor switch, such as a MOSFET or an IGBT. In the example illustrated in FIG. 1, each of the auxiliary switches S5 to S8 is an n-channel IGBT.

The sixth auxiliary switch S6 is one example of a first auxiliary switch in the present disclosure. The eighth auxiliary switch S8 is one example of a second auxiliary switch in the present disclosure. The fifth auxiliary switch S5 is one example of a third auxiliary switch in the present disclosure. The seventh auxiliary switch S7 is one example of a fourth auxiliary switch in the present disclosure.

The transformer T is a high-frequency transformer including a primary winding N1 and a secondary winding N2. The primary winding N1 and the secondary winding N2 are coupled with each other via electromagnetic induction. The transformer T insulates a primary side and a secondary side. In accordance with the turns ratio of the primary winding N1 versus the secondary winding N2, the transformer T converts a first AC voltage input from the primary winding N1 into a second AC voltage output to the secondary winding N2. Two opposite ends of the primary winding N1 are connected to respective two output ends of the full-bridge circuit. For example, two opposite ends of the primary winding N1 are connected between the first node Na and the second node Nb.

The third inductor L3 and the fourth inductor L4 are connected to a current path extending between the secondary winding N2 of the transformer T and the rectifier circuit. The third inductor L3 and the fourth inductor L4 may be a third coil L3 and a fourth coil L4. The third inductor L3 and the fourth inductor L4 may be leakage inductances of the secondary winding N2.

The rectifier circuit rectifies the second AC voltage input from the secondary winding N2 to generate a rectified voltage. The rectifier circuit includes a ninth diode D9, a tenth diode D10, an eleventh diode D11, and a twelfth diode D12, which are connected in a full-bridge configuration.

The smoothing circuit smooths the rectified voltage to generate an output voltage. The smoothing circuit illustrated in FIG. 1 may be an inductor-capacitor (LC) filter including a fifth inductor L5 and a fifth capacitor C5. The fifth inductor L5 is, for example, a fifth coil L5. The smoothing circuit illustrated in FIG. 1 is one example and is not limited thereto. For example, the smoothing circuit does not necessarily have to have the fifth inductor L5.

The output resistor R1 is a current detection element for detecting the value of current supplied from the smoothing circuit to a load 30. A hall effect device may also be used instead of the output resistor R1.

The output-voltage detection circuit 11 detects an output voltage output from the switching power-supply device 10 to the load 30. The output-voltage detection circuit 11 may be, for example, an error amplifier circuit. The error amplifier circuit may include an operational amplifier and a passive element. The output-voltage detection circuit 11 outputs a detection result to the control device 20.

The output-voltage detection circuit 11 is one example of an output detection circuit in the present disclosure.

The output-current detection circuit 12 detects an output current output from the switching power-supply device 10 to the load 30. The output-current detection circuit 12 may be, for example, an error amplifier circuit to which voltages of two opposite ends of the output resistor R1 are input. The output-current detection circuit 12 outputs a detection result to the control device 20.

The output-current detection circuit 12 is one example of the output detection circuit in the present disclosure.

The control device 20 controls on and off of the first to fourth switches S1 to S4 and the fifth to eighth auxiliary switches S5 to S8. In other words, the switching power-supply device 10 is driven by the control device 20. For example, in accordance with an output voltage supplied from the output-voltage detection circuit 11 and/or an output current supplied from the output-current detection circuit 12, the control device 20 controls a phase difference between the phase of a switching operation in the first arm and the phase of a switching operation in the second arm. The control device 20 executes this control by using a phase-shift pulse width modulation (PWM) system. For example, the control device 20 compares the output voltage fed back from the output-voltage detection circuit 11 with a pre-set target voltage. The control device 20 reduces the phase difference, when the output voltage is smaller than the target voltage, and increases the phase difference, when the output voltage is larger than the target voltage. According to this control, the larger the phase difference is, the smaller the power supplied from the primary side to the secondary side is. The control device 20 may also drive the switching power-supply device 10 with a constant current or with constant power.

Figure 2:
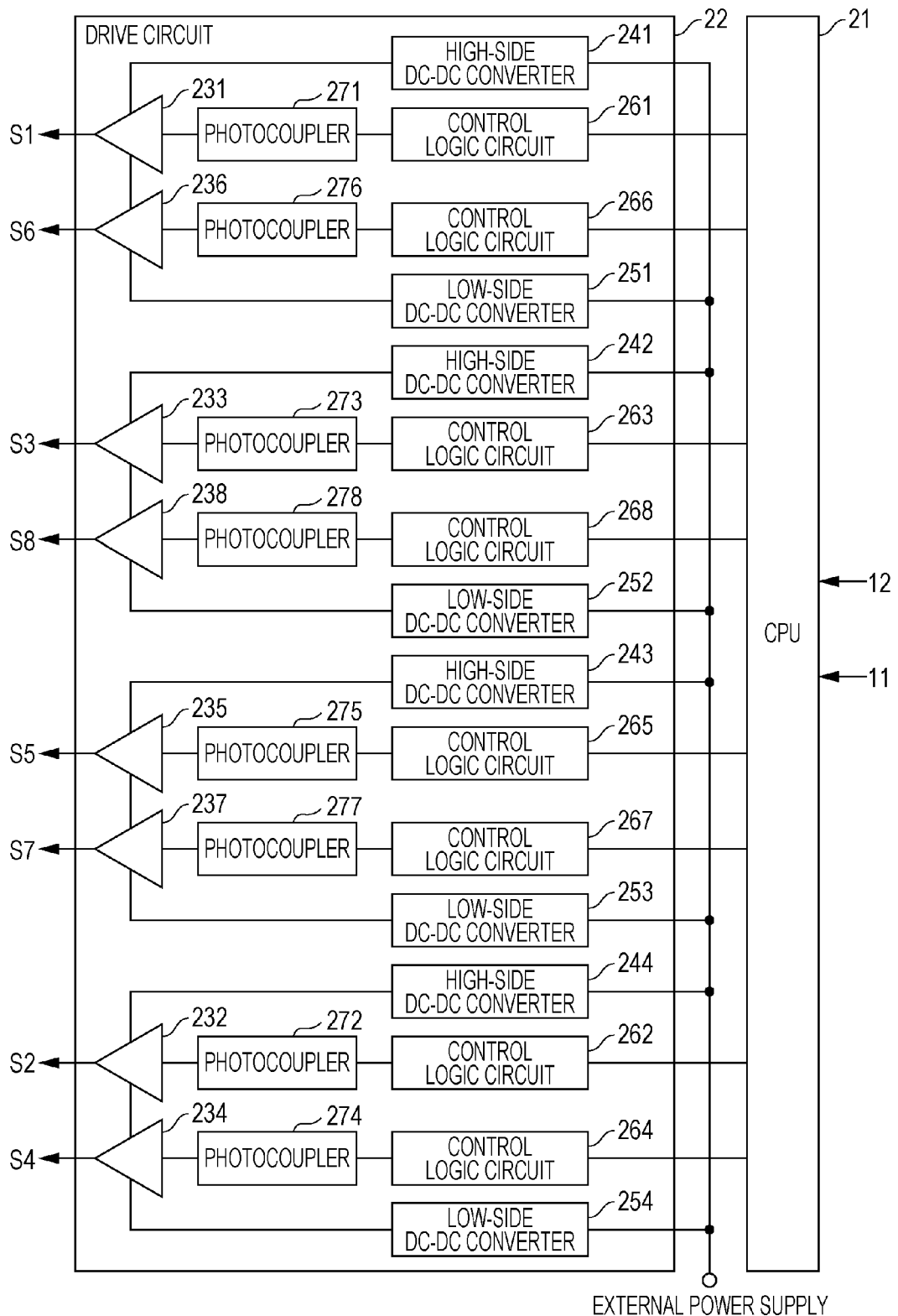
FIG. 2 is a diagram schematically illustrating an example configuration of a control device illustrated in FIG. 1.

FIG. 2 illustrates an example configuration of the control device 20. The control device 20 has a central processing unit (CPU) 21 and a drive circuit 22. In the switching power-supply device 10 illustrated in FIG. 1, the emitter terminal of the first switch S1 and the emitter terminal of the sixth auxiliary switch S6 have equal potentials. The emitter terminal of the third switch S3 and the emitter terminal of the eighth auxiliary switch S8 have equal potentials. The emitter terminal of the fifth auxiliary switch S5 and the emitter terminal of the seventh auxiliary switch S7 have equal potentials. The emitter terminal of the second switch S2 and the emitter terminal of the fourth switch S4 have equal potentials. In this case, for example, it is sufficient for the drive circuit 22 to generate four pairs of drive voltages, each pair having a high level voltage and a low level voltage. In other words, the emitter potentials between the plurality of switches are shared, so that the circuitry for generating power-supply voltages can be shared. This can reduce the circuit scale and can reduce the cost.

Power from an external power supply is supplied to the CPU 21 and the drive circuit 22. The external power supply may be, for example, a commercial power supply or a battery. In accordance with the output voltage supplied from the output-voltage detection circuit 11 and/or the output current supplied from the output-current detection circuit 12, the CPU 21 generates control signals for the first to fourth switches S1 to S4 and the fifth to eighth auxiliary switches S5 to S8 and then outputs the control signals to the drive circuit 22. The control signals are, for example, digital signals.

A specific example of the drive circuit 22 will be described below. The drive circuit 22 has a first driver, a second driver, a third driver, and a fourth driver. These drivers, however, do not necessarily have to be formed together on a circuit.

The first driver has a first high-side DC-DC converter 241, a first low-side DC-DC converter 251, a first gate buffer 231, a second gate buffer 236, a first control logic circuit 261, a second control logic circuit 266, a first photocoupler 271, and a second photocoupler 276. The first driver drives the first switch S1 and the sixth auxiliary switch S6.

The first control logic circuit 261 generates a drive signal in accordance with an input control signal. With the first control logic circuit 261 and the first gate buffer 231 being insulated from each other, the first photocoupler 271 transmits the drive signal from the first control logic circuit 261 to the first gate buffer 231. In accordance with the input drive signal, the first gate buffer 231 drives the first switch S1. An output terminal of the first gate buffer 231 is connected to a gate terminal of the first switch S1 via a current-limiting element (not illustrated). The current-limiting element is, for example, a gate resistor. The first gate buffer 231 is, for example, an inverter in which a p-channel MOSFET and an n-channel MOSFET are connected in series.

The second control logic circuit 266 generates a drive signal in accordance with an input control signal. With the second control logic circuit 266 and the second gate buffer 236 being insulated from each other, the second photocoupler 276 transmits the drive signal from the second control logic circuit 266 to the second gate buffer 236. The second gate buffer 236 drives the sixth auxiliary switch S6 in accordance with the input drive signal. An output terminal of the second gate buffer 236 is connected to a gate terminal of the sixth auxiliary switch S6 via a current-limiting element (not illustrated). The current-limiting element is, for example, a gate resistor. The second gate buffer 236 is, for example, an inverter in which a p-channel MOSFET and an n-channel MOSFET are connected in series.

The first high-side DC-DC converter 241 generates a high-side power-supply potential from the external power supply. The first low-side DC-DC converter 251 generates a low-side power-supply potential from the external power supply. The first high-side DC-DC converter 241 and the first low-side DC-DC converter 251 may be, for example, step-down choppers. For example, when the first gate buffer 231 is an inverter, the high-side power-supply potential is applied to a source terminal of the p-channel MOSFET, and the low-side power-supply potential is applied to a source terminal of the n-channel MOSFET.

The first high-side DC-DC converter 241 generates a potential of +15 V relative to a reference potential and then supplies the generated potential to the first gate buffer 231 and the second gate buffer 236. The first low-side DC-DC converter 251 generates a potential of −5 V relative to the reference potential and then supplies the generated potential to the first gate buffer 231 and the second gate buffer 236. That is, the first gate buffer 231 and the second gate buffer 236 are controlled with a power-supply voltage of 20 V. The first gate buffer 231 applies a gate potential of +15 V, whose reference is the emitter potential, to the first switch S1. The second gate buffer 236 applies a gate potential of −5 V, whose reference is the emitter potential, to the sixth auxiliary switch S6. However, the values of the power-supply voltage and the gate potentials are not limited to these values.

The second driver has a second high-side DC-DC converter 242, a second low-side DC-DC converter 252, a third gate buffer 233, a fourth gate buffer 238, a third control logic circuit 263, a fourth control logic circuit 268, a third photocoupler 273, and a fourth photocoupler 278. The second driver drives the third switch S3 and the eighth auxiliary switch S8. The constituent elements in the second driver can also be explained, for example, in the same manner as for the first driver.

The third driver has a third high-side DC-DC converter 243, a third low-side DC-DC converter 253, a fifth gate buffer 235, a sixth gate buffer 237, a fifth control logic circuit 265, a sixth control logic circuit 267, a fifth photocoupler 275, and a sixth photocoupler 277. The third driver drives the fifth auxiliary switch S5 and the seventh auxiliary switch S7. The constituent elements in the third driver can also be explained, for example, in the same manner as for the first driver.

The fourth driver has a fourth high-side DC-DC converter 244, a fourth low-side DC-DC converter 254, a seventh gate buffer 232, an eighth gate buffer 234, a seventh control logic circuit 262, an eighth control logic circuit 264, a seventh photocoupler 272, and an eighth photocoupler 274. The fourth driver drives the second switch S2 and the fourth switch S4. The constituent elements in the fourth driver can also be explained, for example, in the same manner as for the first driver.

Since the switches included in the switching power-supply device 10 have the connection relationship illustrated in FIG. 1, it is possible to simplify the configuration of the drive circuit 22. Since the emitter terminals of the switches are connected to each other, for example, it is possible to reduce the number of high-side DC-DC converters and the number of low-side DC-DC converters. In the example illustrated in FIG. 2, the drive circuit 22 includes four high-side DC-DC converters, four low-side DC-DC converters, eight gate buffers, eight control logic circuits, and eight photocouplers.

[Drive Method for Switching Power-Supply Device 10]

A drive method for the switching power-supply device 10, that is, an operation method for the control device 20, will now be described by way of example.

Since the switching power-supply device 10 has the partial-resonance-type full-bridge circuit, the control device 20 permits a resonance operation during the dead time of the first arm of the full-bridge circuit and during the dead time of the second arm.

In a period in which the first switch S1 or the second switch S2 is in the ON state, the control device 20 puts both the fifth auxiliary switch S5 and the sixth auxiliary switch S6 into the OFF state. In a period in which the third switch S3 or the fourth switch S4 is in the ON state, the control device 20 puts both the seventh auxiliary switch S7 and the eighth auxiliary switch S8 into the OFF state. As a result, unwanted current does not flow to the first auxiliary inductor L1 or the second auxiliary inductor L2, and loss can be reduced.

For example, the control device 20 detects a value according to at least one of the output voltage and the output current of the switching power-supply device 10 and then compares the detected value with a setting value. In accordance with a result of the comparison, the control device 20 determines whether or not an on/off operation is to be performed on the fifth to eighth auxiliary switches S5 to S8.

When the detected value exceeds the setting value, the control device 20 maintains the fifth to eighth auxiliary switches S5 to S8 in the OFF state. That is, the on/off operation of the fifth to eighth auxiliary switches S5 to S8 is disabled, thereby preventing generation of resonance current due to the first auxiliary inductor L1 and the second auxiliary inductor L2.

When the detected value is smaller than or equal to the setting value, the control device 20 puts the fifth auxiliary switch S5 or the sixth auxiliary switch S6 into the ON state during the dead time of the first arm. For example, each time the dead time of the first arm arrives, the control device 20 alternately turns on the fifth auxiliary switch S5 or the sixth auxiliary switch S6. When the fifth auxiliary switch S5 is in the ON state and the sixth auxiliary switch S6 is in the OFF state, the second capacitor C2 is discharged, and the first capacitor C1 is charged. That is, charge accumulated in the second capacitor C2 is commutated to the first capacitor C1. When the sixth auxiliary switch S6 is in the ON state and the fifth auxiliary switch S5 is in the OFF state, the first capacitor C1 is discharged, and the second capacitor C2 is charged. That is, charge accumulated in the first capacitor C1 is commutated to the second capacitor C2. These charging/discharging operations allow the switch connected in parallel with the discharged capacitor to perform zero voltage switching.

When the detected value is smaller than or equal to the setting value, the control device 20 puts the seventh auxiliary switch S7 or the eighth auxiliary switch S8 into the ON state during the dead time of the second arm. For example, each time the dead time of the second arm arrives, the control device 20 alternately turns on the seventh auxiliary switch S7 or the eighth auxiliary switch S8. When the seventh auxiliary switch S7 is in the ON state and the eighth auxiliary switch S8 is in the OFF state, the fourth capacitor C4 is discharged, and the third capacitor C3 is charged. That is, charge accumulated in the fourth capacitor C4 is commutated to the third capacitor C3. When the eighth auxiliary switch S8 is in the ON state and the seventh auxiliary switch S7 is in the OFF state, the third capacitor C3 is discharged, and the fourth capacitor C4 is charged. That is, charge accumulated in the third capacitor C3 is commutated to the fourth capacitor C4. These charging/discharging operations allow the switch connected in parallel with the discharged capacitor to perform zero voltage switching.

The amount of current generated by the charging/discharging of the first to fourth capacitors C1 to C4 is determined by an LC resonant frequency, a DC voltage applied to the first auxiliary inductor L1 or the second auxiliary inductor L2, and on times $\Delta t$ of the fifth to eighth auxiliary switches S5 to S8. In the first embodiment, an LC constant, the DC voltage, and each on time $\Delta t$ all have fixed values. Hence, the amount of current that can be supplied from the first auxiliary inductor L1 or the second auxiliary inductor L2 to the first to fourth capacitors C1 to C4 is constant, regardless of the state of the output voltage or the output current of the switching power-supply device 10. In addition, since the LC constant, the DC voltage, and the on time $\Delta t$ are fixed, the waveform of the resonance current is stabilized, and an influence of component variations can be reduced.

In the example illustrated in FIG. 1, the third inductor L3 and the fourth inductor L4 also generate resonance current during the dead time of the first arm or the second arm. With this resonance current, the charging/discharging operations of the first to fourth capacitors C1 to C4 are also performed. The amount of current supplied from the third inductor L3 or the fourth inductor L4 to the first to fourth capacitors C1 to C4 changes depending on the output current, reflecting a load state, of the switching power-supply device 10.

In accordance with at least one of the output voltage and the output current from the switching power-supply device 10, the control device 20 selects whether or not resonance current is to be generated using the first auxiliary inductor L1 and the second auxiliary inductor L2. For example, when the output current of the switching power-supply device 10 is larger than the setting value, the control device 20 maintains the fifth to eighth auxiliary switches S5 to S8 in the OFF state, and when the output current of the switching power-supply device 10 is smaller than or equal to the setting value, the control device 20 enables the on/off operation of the fifth to eighth auxiliary switches S5 to S8. The former corresponds to a case of heavy load, and the latter corresponds to a case of light load.

When the fifth to eighth auxiliary switches S5 to S8 are maintained in the OFF state, resonance current is supplied from only the third inductor L3 and the fourth inductor L4 to the first to fourth capacitors C1 to C4. In this case, the switching power-supply device 10 can realize soft switching by using the current generated by the third inductor L3 and the fourth inductor L4. Alternatively, even when soft switching is not completely realized, it is possible to effectively reduce the switching loss.

For example, when the output current of the switching power-supply device 10 is small, there are cases in which soft switching cannot be realized with only current supplied from the third inductor L3 and the fourth inductor L4. In such cases, the control device 20 enables the on/off operation of the fifth to eighth auxiliary switches S5 to S8. As a result, resonance current is supplied not only from the third inductor L3 and the fourth inductor L4 but also from the first auxiliary inductor L1 or the second auxiliary inductor L2 to the first to fourth capacitors C1 to C4. That is, because of the resonance current from the first auxiliary inductor L1 or the second auxiliary inductor L2, the amount of current supplied to the first to fourth capacitors C1 to C4 increases. As a result, for example, even when the output current of the switching power-supply device 10 is large, it is possible to realize soft switching. Alternatively, even when soft switching is not completely realized, it is possible to effectively reduce the switching loss.

The output voltage and the output current of the switching power-supply device 10 and the setting value for determining the magnitude relationship of the output power may be values pre-derived according to an experiment or simulation performed by a designer.

Figure 3A:
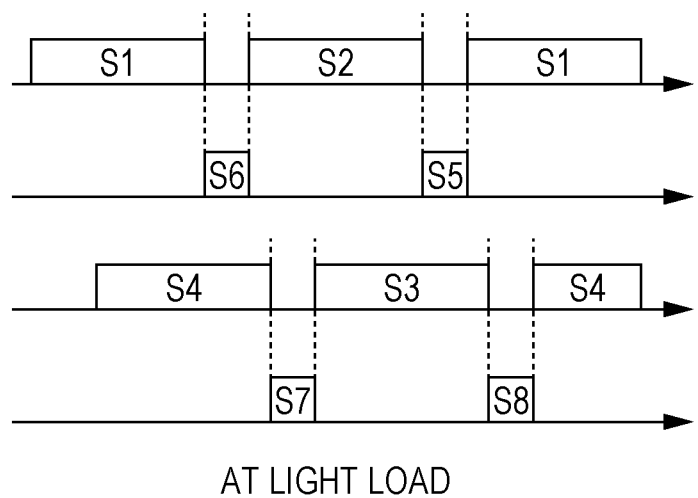
FIGS. 3A and 3B are timing charts schematically illustrating example operations of a switching power-supply device illustrated in FIG. 1.
Figure 3B:
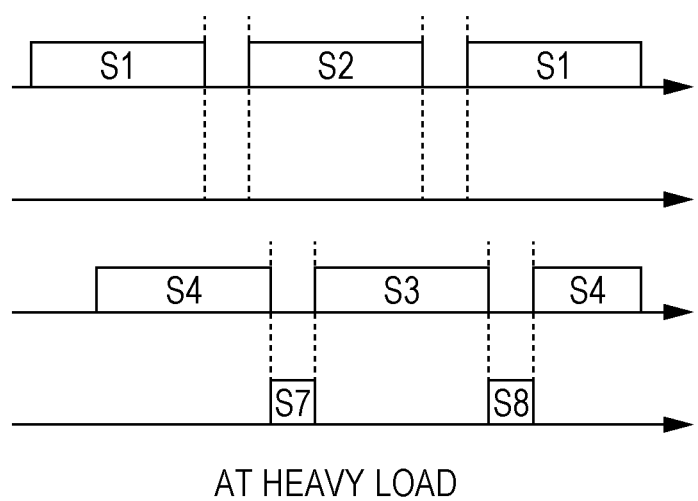

FIGS. 3A and 3B are timing charts illustrating an example operation of the switching power-supply device 10 in FIG. 1. FIG. 3A is a timing chart at light load, and FIG. 3B is a timing chart at heavy load. Whether the load 30 is light or heavy can be determined based on at least one of the output voltage and the output current. For example, when the detection value based on at least one of the output voltage and the output current of the switching power-supply device 10 is smaller than or equal to a predetermined setting value, the load 30 is classified in a light load, and when the detection value exceeds the setting value, the load 30 is classified in a heavy-load.

In the example illustrated in FIG. 3A, at light load, the on/off operation of the fifth to eighth auxiliary switches S5 to S8 is enabled. For example, in a period from when the first switch S1 is turned off until the second switch S2 is turned on, the sixth auxiliary switch S6 is put into the ON state. In a period from when the second switch S2 is turned off until the first switch S1 is turned on, the fifth auxiliary switch S5 is put into the ON state. In a period from when the fourth switch S4 is turned off until the third switch S3 is turned on, the seventh auxiliary switch S7 is put into the ON state. In a period from when the third switch S3 is turned off until the fourth switch S4 is turned on, the eighth auxiliary switch S8 is put into the ON state. In this example operation, the on period Δt of each of the fifth to eighth auxiliary switches S5 to S8 is fixed.

In the example illustrated in FIG. 3B, at heavy load, the on/off operation of the fifth auxiliary switch S5 and the sixth auxiliary switch S6 during the dead time of the first arm is disabled, and the on/off operation of the seventh auxiliary switch S7 and the eighth auxiliary switch S8 during the dead time of the second arm is enabled. Alternatively, during the dead time of the second arm, the on/off operation of the seventh auxiliary switch S7 and the eighth auxiliary switch S8 may also be disabled. Alternatively, the on/off operation of the fifth auxiliary switch S5 and the sixth auxiliary switch S6 during the dead time of the first arm may be enabled, and the on/off operation of the seventh auxiliary switch S7 and the eighth auxiliary switch S8 during the dead time of the second arm may be disabled. Which of these operations is to be selected may also be determined based on at least one of the output voltage and the output current.

Figure 4A:
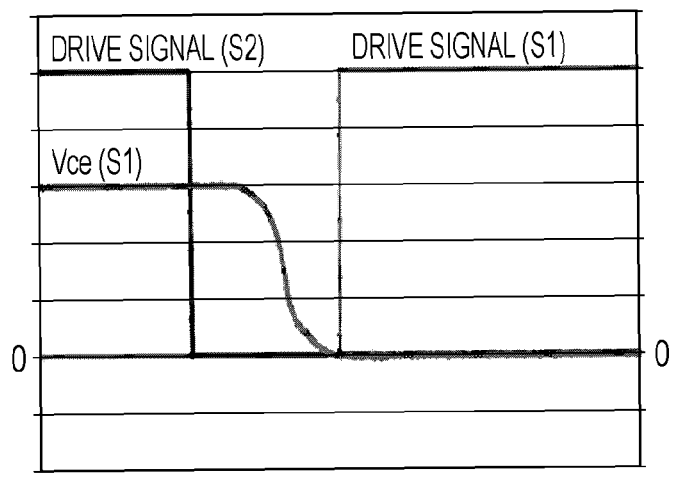
FIGS. 4A to 4C are diagrams illustrating zero voltage switching (ZVS)
Figure 4B:
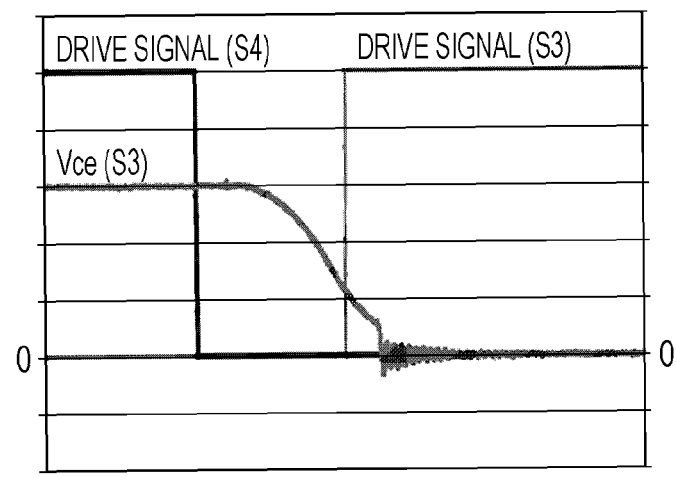
Figure 4C:
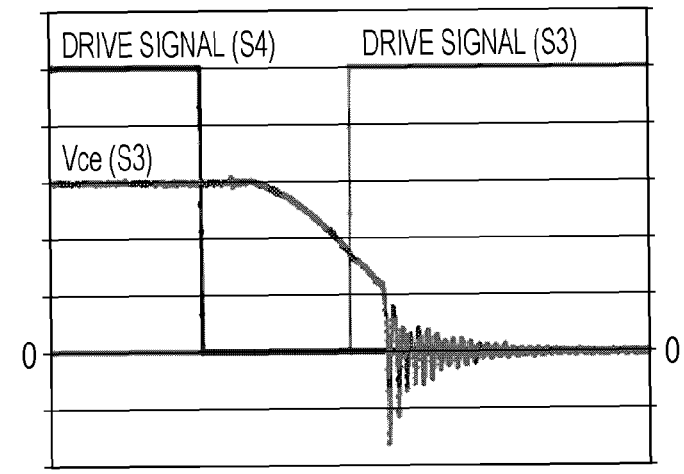

FIGS. 4A to 4C are diagrams illustrating zero voltage switching (ZVS). FIG. 4A illustrates one example of a timing chart when ZVS is achieved. FIGS. 4B and 4C illustrate examples of a timing chart when ZVS is not achieved.

A description will be given of a case in which ZVS is achieved in the first switch S1. Before an ON signal is applied to the gate terminal of the first switch S1, the resonance current that flows through the auxiliary inductor and the first capacitor C1 causes all of the charge in the first capacitor C1 to be discharged. As a result, a voltage between the collector terminal and the emitter terminal of the first switch S1 becomes zero. In this state, when the first switch S1 is turned on, ZVS is realized. In this case, neither switching loss nor a surge voltage occurs, as illustrated in FIG. 4A.

A description will be given of a case in which ZVS is not achieved in the third switch S3. Before an ON signal is applied to a gate terminal of the third switch S3, there are cases in which some of the charge in the third capacitor C3 is not discharged. In this state, when the third switch S3 is turned on, ZVS is not realized, so that switching loss and a surge voltage occur. The closer to 0 the voltage between the collector terminal and the emitter terminal of the third switch S3 is immediately before the third switch S3 is turned on, the smaller the switching loss and the surge voltage become. FIG. 4B illustrates an example in which the switching loss and the surge voltage are effectively reduced through use of an auxiliary inductor.

According to the power conversion apparatus 100 in the first embodiment, when the resonance current is insufficient, the resonance current due to the auxiliary inductor can be reliably supplied to each capacitor. As a result, the switching loss and the surge voltage can become zero or can be effectively reduced. On the other hand, when the resonance current is excessive, the auxiliary switch between the auxiliary inductor and each capacitor is turned off to thereby stop supply of unwanted resonance current. Thus, it is possible to reliably reduce loss caused by the flow of the resonance current through the auxiliary inductor.

Second Embodiment

Configuration of Power Conversion Apparatus 100x

Figure 5:
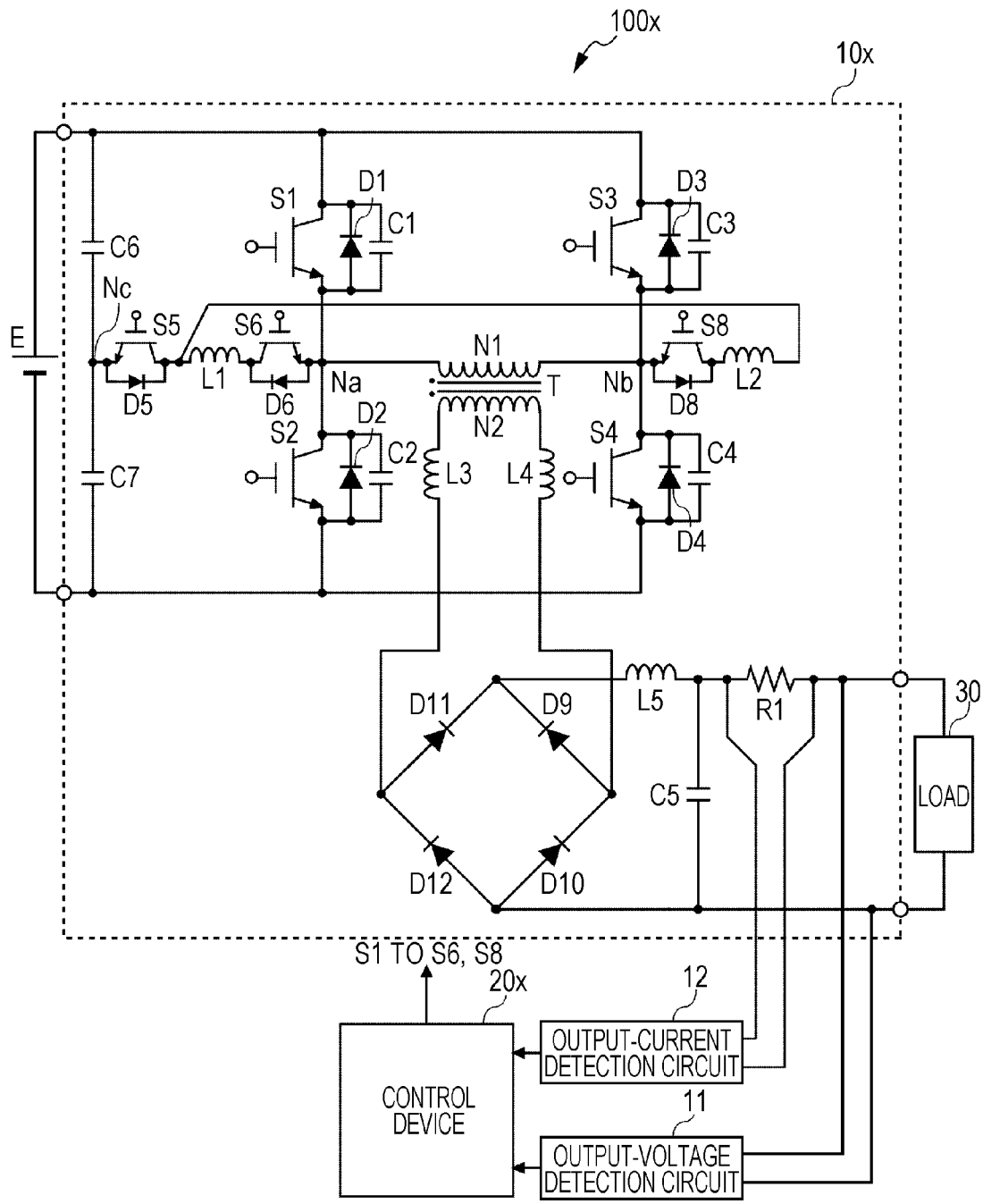
FIG. 5 is a diagram schematically illustrating an example configuration of a power conversion apparatus according to a second embodiment.

FIG. 5 illustrates one example of the configuration of a power conversion apparatus 100x according to a second embodiment. The description below will be given of differences between the power conversion apparatus 100x according to the second embodiment and the power conversion apparatus 100 according to the first embodiment. A redundant description between the power conversion apparatuses 100x and 100 will be omitted as appropriate.

A fifth auxiliary switch S5 illustrated in FIG. 5 has both of the functions of the fifth auxiliary switch S5 and the seventh auxiliary switch S7 illustrated in FIG. 1. In the example illustrated in FIG. 5, the fifth auxiliary switch S5 is connected between an intermediate node Nc and a common terminal to which a first auxiliary inductor L1 and a second auxiliary inductor L2 are connected. For example, an emitter terminal of the fifth auxiliary switch S5 is connected to the intermediate node Nc, and a collector terminal of the fifth auxiliary switch S5 is connected to both a first end of the first auxiliary inductor L1 and a first end of the second auxiliary inductor L2.

Figure 6:
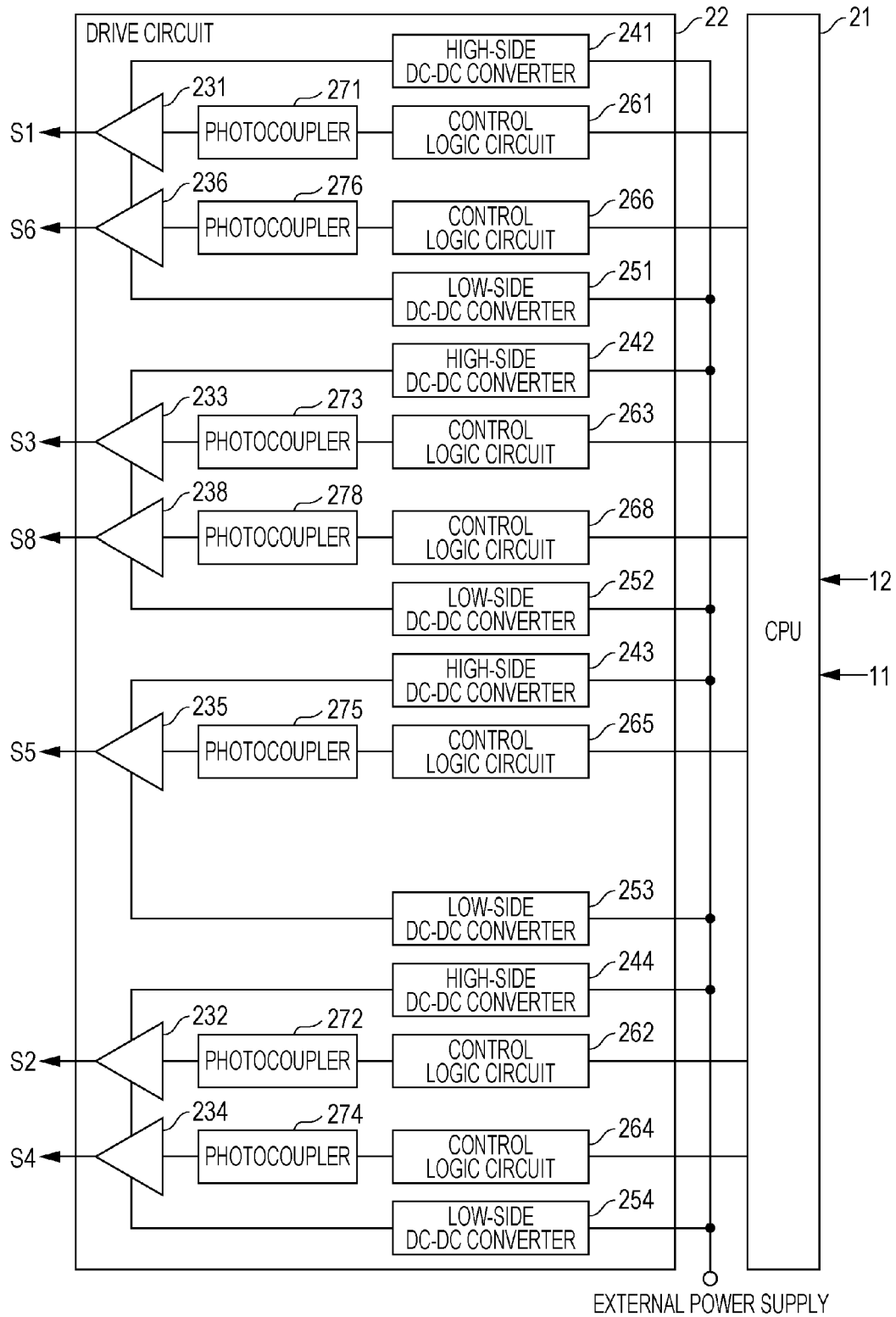
FIG. 6 is a diagram schematically illustrating an example configuration of a control device illustrated in FIG. 5.

FIG. 6 illustrates an example configuration of a control device 20x. The control device 20x illustrated in FIG. 6 differs from the control device 20 illustrated in FIG. 2 in that the control device 20x does not have the sixth gate buffer 237, the sixth control logic circuit 267, and the sixth photocoupler 277. Since the auxiliary switches connected to the intermediate node Nc are integrated as the fifth auxiliary switch S5, the circuit scale can be further reduced, compared with the control device 20 illustrated in FIG. 2.

[Drive Method for Switching Power-Supply Device 10x]

A drive method for a switching power-supply device 10x, that is, an operation method for the control device 20x, will be described by way of example.

In a period in which the first switch S1 or the second switch S2 is in an ON state, the control device 20x puts both the fifth auxiliary switch S5 and the sixth auxiliary switch S6 into an OFF state. In a period in which the third switch S3 or the fourth switch S4 is in an ON state, the control device 20x puts both the fifth auxiliary switch S5 and the eighth auxiliary switch S8 into the OFF state. As a result, unwanted current does not flow to the first auxiliary inductor L1 or the second auxiliary inductor L2, thus making it possible to reduce loss.

The control device 20x detects a value according to at least one of an output voltage and an output current of the switching power-supply device 10x and then compares the detected value with a setting value. In accordance with a result of the comparison, the control device 20x determines whether or not an on/off operation is to be performed on the fifth auxiliary switch S5, the sixth auxiliary switch S6, and the eighth auxiliary switch S8.

When the detected value exceeds the setting value, the control device 20 maintains the fifth auxiliary switch S5, the sixth auxiliary switch S6, and the eighth auxiliary switch S8 in the OFF state. That is, the on/off operation of the fifth auxiliary switch S5, the sixth auxiliary switch S6, and the eighth auxiliary switch S8 is disabled, thereby preventing generation of resonance current due to the first auxiliary inductor L1 and the second auxiliary inductor L2.

When the detected value is smaller than or equal to the setting value, the control device 20x puts the fifth auxiliary switch S5 or the sixth auxiliary switch S6 into an ON state during the dead time of the first arm. For example, each time the dead time of the first arm arrives, the control device 20x alternately turns on the fifth auxiliary switch S5 or the sixth auxiliary switch S6.

When the detected value is smaller than or equal to the setting value, the control device 20x puts the fifth auxiliary switch S5 or the eighth auxiliary switch S8 into the ON state during the dead time of the second arm. For example, each time the dead time of the second arm arrives, the control device 20x alternately turns on the fifth auxiliary switch S5 or the eighth auxiliary switch S8.

Figure 7A:
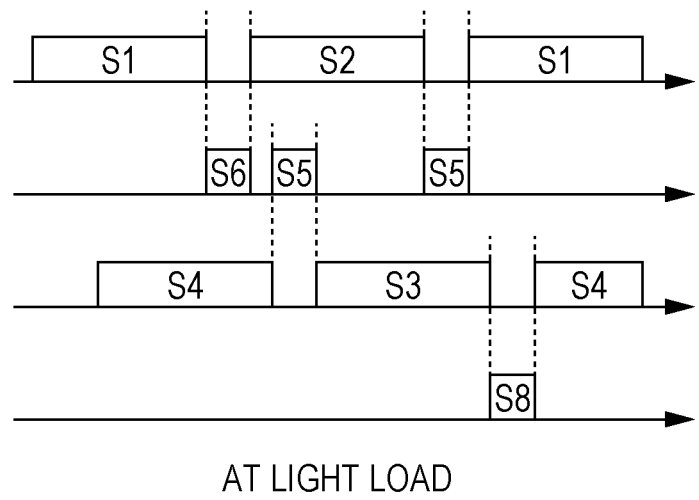
FIGS. 7A and 7B are timing charts schematically illustrating example operations of a switching power-supply device illustrated in FIG. 5.
Figure 7B:
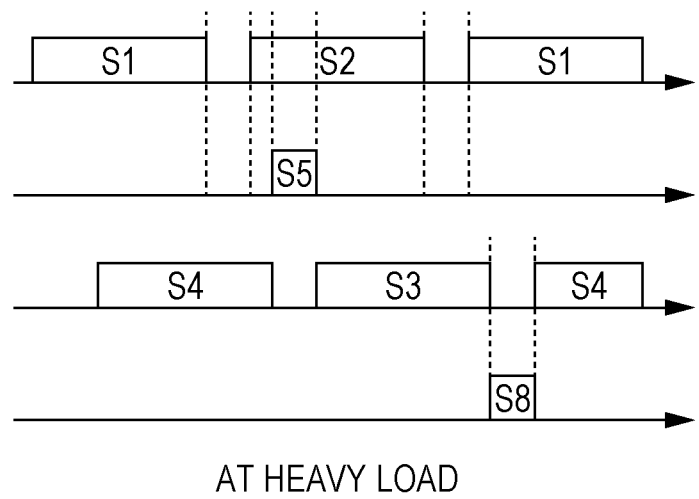

FIGS. 7A and 7B are timing charts illustrating example operations of the switching power-supply device 10x in FIG. 5. FIG. 7A is a timing chart at light load, and FIG. 7B is a timing chart at heavy load.

In the example illustrated in FIG. 7A, at light load, the on/off operation of the fifth auxiliary switch S5, the sixth auxiliary switch S6, and the eighth auxiliary switch S8 is enabled. For example, in a period from when the first switch S1 is turned off until the second switch S2 is turned on, the sixth auxiliary switch S6 is put into the ON state. In a period from when the second switch S2 is turned off until the first switch S1 is turned on, the fifth auxiliary switch S5 is put into the ON state. In a period from when the fourth switch S4 is turned off until the third switch S3 is turned on, the fifth auxiliary switch S5 is put into the ON state. In a period from when the third switch S3 is turned off until the fourth switch S4 is turned on, the eighth auxiliary switch S8 is put into the ON state. The on period At of each of the fifth to seventh auxiliary switches S5 to S7 is fixed.

In the example illustrated in FIG. 7B, at heavy load, the on/off operation of the fifth auxiliary switch S5 and the sixth auxiliary switch S6 during the dead time of the first arm is disabled, and the on/off operation of the fifth auxiliary switch S5 and the eighth auxiliary switch S8 during the dead time of the second arm is enabled. Alternatively, during the dead time of the second arm, the on/off operation of the fifth auxiliary switch S5 and the eighth auxiliary switch S8 may also be disabled. Alternatively, the on/off operation of the fifth auxiliary switch S5 and the sixth auxiliary switch S6 during the dead time of the first arm may be enabled, and the on/off operation of the fifth auxiliary switch S5 and the eighth auxiliary switch S8 during the dead time of the second arm may be disabled. Which of these operations is to be selected may also be determined based on at least one of the output voltage and the output current.

According to the power conversion apparatus 100x in the second embodiment, when the resonance current is insufficient, the resonance current due to the auxiliary inductor can be reliably supplied to each capacitor. As a result, the switching loss and the surge voltage can become zero or can be effectively reduced. On the other hand, when the resonance current is excessive, the auxiliary switch between the auxiliary inductor and each capacitor is turned off to thereby make it possible to stop unwanted resonance current. Thus, it is possible to reliably reduce loss due to the flow of the resonance current through the auxiliary inductor.

Third Embodiment

Figure 8:
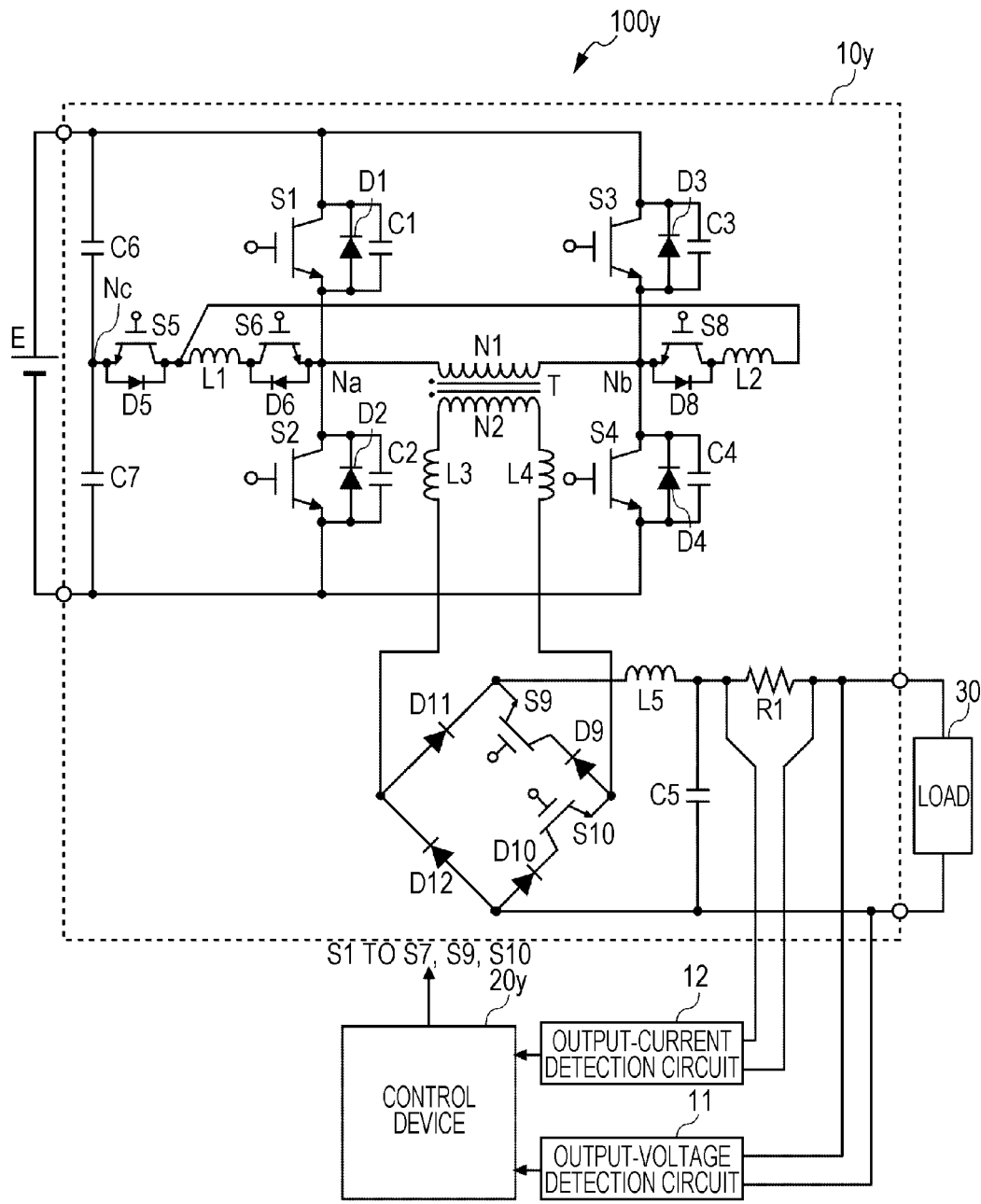
FIG. 8 is a diagram schematically illustrating an example configuration of a power conversion apparatus according to a third embodiment.

FIG. 8 illustrates one example of the configuration of a power conversion apparatus 100y according to a third embodiment. A switching power-supply device 10y in the power conversion apparatus 100y is driven by a secondary-side phase shift system. The description below will be given of differences between the power conversion apparatus 100y according to the third embodiment and the power conversion apparatus 100x according to the second embodiment. A redundant description between the power conversion apparatuses 100y and 100x will be omitted as appropriate.

A rectifier circuit in the switching power-supply device 10y further has a ninth switch S9 for passing or blocking forward current from a secondary winding N2 of a transformer T and a tenth switch S10 for passing or blocking reverse current from the secondary winding N2. A control device 20y fixes the phases of switches S1 to S4 at the primary side and makes the phases of the switches S9 and S10 at the secondary side variable. In accordance with an output voltage supplied from an output-voltage detection circuit 11 and/or an output current supplied from an output-current detection circuit 12, the control device 20y controls a phase difference of the phases of the switches S9 and S10 at the secondary side from the phases of the switches S1 to S4 at the primary side.

Since the phases of the switches S1 to S4 at the primary side are fixed, the phases of auxiliary switches S5, S6, and S8 are also fixed. As a result, the driving of the primary-side circuit can also be stabilized.

The primary-side circuit in the switching power-supply device 10 illustrated in FIG. 1 and the secondary-side circuit in the switching power-supply device 10y illustrated in FIG. 8 may also be combined and driven by a secondary-side phase shift system.

Fourth Embodiment

The power conversion apparatuses according to the first to third embodiments described above can be used for various applications. The description below will be given of an example in which the power conversion apparatuses according to the first to third embodiments are used for an electricity storage system, a vehicle, and a charger. In addition, the power conversion apparatuses in the present disclosure can also be used for applications that require highly efficient power conversion and insulation, for example, for power-supply devices in data centers.

Figure 9:
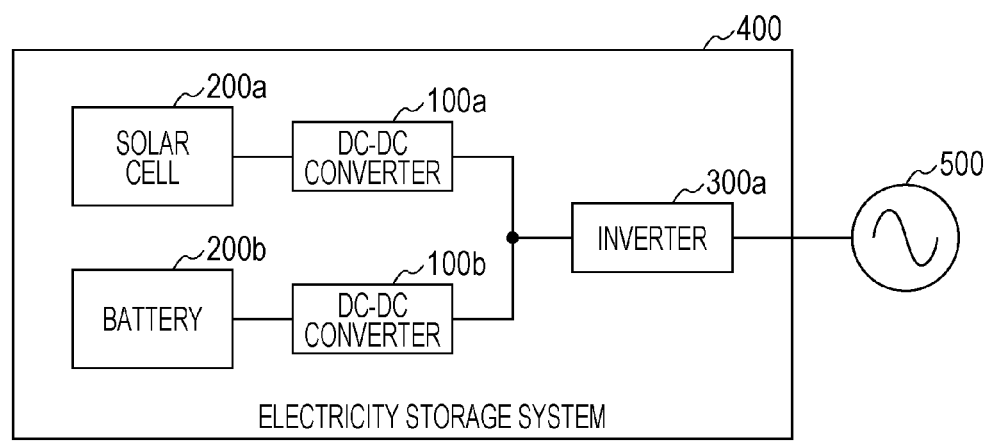
FIG. 9 is a diagram schematically illustrating an example configuration of an electricity storage system according to a fourth embodiment.

FIG. 9 illustrates an example configuration of an electricity storage system 400 having any of the power conversion apparatuses according to the first to third embodiments. The electricity storage system 400 illustrated in FIG. 9 has a solar cell 200a, a battery 200b, DC-DC converters 100a and 100b, and an inverter 300a. The battery 200b may be a stationary battery or may be a transportable battery, such as an on-board battery. The solar cell 200a generates first DC power. The DC-DC converter 100a converts the first DC power into second DC power. The inverter 300a converts the second DC power into AC power. Alternatively, the DC-DC converter 100b converts the second DC power into DC power for power accumulation, and the DC power is accumulated in the battery 200b. At least one of the DC-DC converters 100a and 100b includes any of the power conversion apparatuses according to the first to third embodiments.

The battery 200b and the DC-DC converter 100b may also be eliminated. In such a case, a photovoltaic system that has no electricity storage function is realized. The solar cell 200a and the DC-DC converter 100a may also be eliminated. In this case, an electricity storage system that has no electricity generation function is realized.

Figure 10:
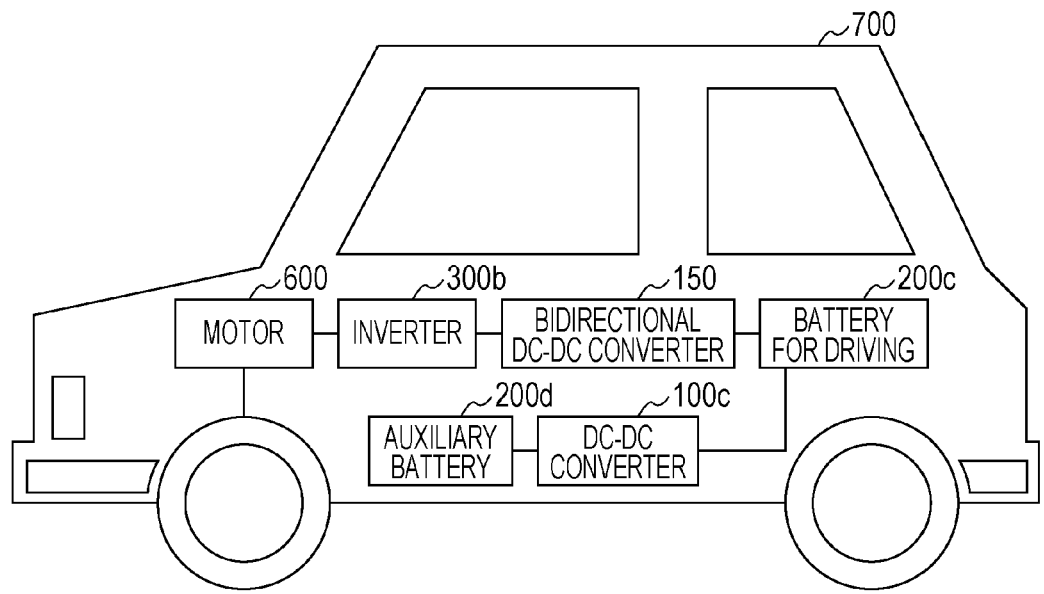
FIG. 10 is a diagram schematically illustrating an example configuration of a vehicle according to the fourth embodiment.

FIG. 10 illustrates an example configuration of a vehicle 700 having any of the power conversion apparatuses according to the first to third embodiments. The vehicle 700 illustrated in FIG. 10 is, for example, a hybrid vehicle (HV), a plug-in hybrid vehicle (PHV), or an electric vehicle (EV) having a motor 600 for driving. The motor 600 may be a self-propelled high-power motor or a drive-assisting motor installed in a mild hybrid vehicle. The motor 600 is, for example, an AC synchronous motor.

The vehicle 700 illustrated in FIG. 10 includes a battery 200c for driving, an auxiliary battery 200d, a DC-DC converter 100c, a bidirectional DC-DC converter 150, an inverter 300b, and the motor 600. The battery 200c for driving is, for example, a battery, such as a lithium-ion battery or a nickel-metal hydride battery. For powering the vehicle 700, the bidirectional DC-DC converter 150 converts first DC power, supplied from the battery 200c for driving, into second DC power. The inverter 300b converts the second DC power into AC power and supplies the AC power to the motor 600. During regeneration, the inverter 300b converts AC power generated based on deceleration energy into third DC power. The bidirectional DC-DC converter 150 converts the third DC power into DC power for a battery and charges the battery 200c for driving.

The auxiliary battery 200d is, for example, a 12 V output lead-acid battery. In mild hybrid vehicles, the battery 200c for driving is designed to have, for example, a 48 V output. A 12 V system to which the auxiliary battery 200d is connected and a 48 V system to which the battery 200c for driving is connected are connected via the DC-DC converter 100c. The DC-DC converter 100c increases the voltage of the auxiliary battery 200d to the voltage of the battery 200c for driving. Thus, when the amount of charge in the battery 200c for driving becomes insufficient, power can be fed from the auxiliary battery 200d to the motor 600. The DC-DC converter 100c reduces the voltage of the battery 200c for driving to the voltage of the auxiliary battery 200d. The DC-DC converter 100c includes any of the power conversion apparatuses according to the first to third embodiments.

Figure 11:
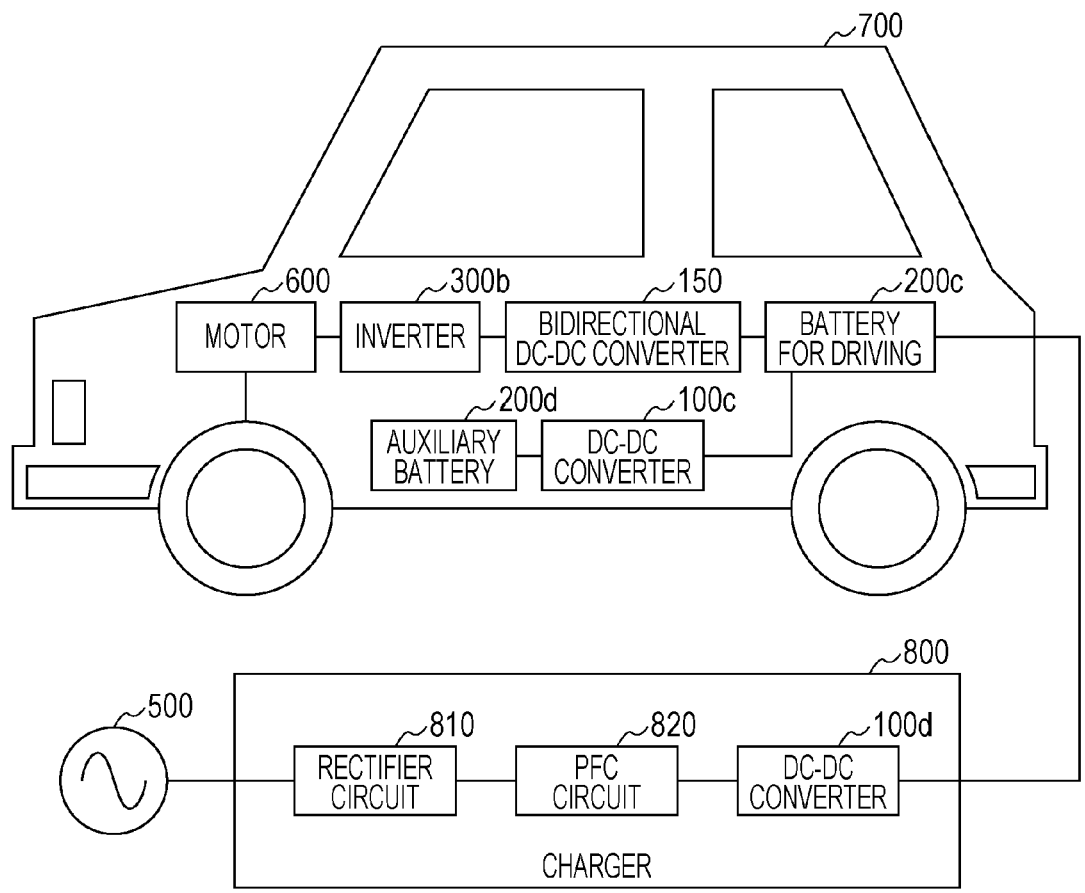
FIG. 11 is a diagram schematically illustrating an example configuration of a charger according to the fourth embodiment.

FIG. 11 is a diagram illustrating the configuration of a charger 800 to which any of the power conversion apparatuses according to the first to third embodiments is applied. A vehicle 700 illustrated in FIG. 11 has a plug-in charging function in addition to the vehicle 700 illustrated in FIG. 10. The charger 800 has a rectifier circuit 810, a power factor correction (PFC) circuit 820, and a DC-DC converter 100d. The rectifier circuit 810 rectifies an AC voltage supplied from a system 500. The PFC circuit 820 improves a power factor of rectified power. The DC-DC converter 100d converts a voltage, input from the PFC circuit 820, into a charging voltage. The DC-DC converter 100d includes any of the power conversion apparatuses according to the first to third embodiments. The charger 800 may be a charger installed external to the vehicle 700, as illustrated in FIG. 11, or may be an on-board charger installed in the vehicle 700.

As described above, the DC-DC converter for use in the electricity storage system 400, the vehicle 700, or the charger 800 has any of the power conversion apparatuses according to the first to third embodiments. This can configure a simple, low cost, low-loss power-supply system.

The above description has been given based on the embodiments of the present disclosure. It is to be understood by those skilled in the art that various modifications are possible to a combination of the constituent elements and/or the processing processes in the present disclosure, and such modifications also fall within the scope of the present disclosure.

For example, the primary-side inverter in the switching power-supply device may be a half-bridge inverter, not a full-bridge inverter. The secondary-side rectifier circuit in the switching power-supply device 10 may be a center-tap rectifier circuit, not a bridge rectifier circuit.

The first to fourth capacitors C1 to C4 may be the parasitic capacitances of the respective first to fourth switches S1 to S4, not lossless snubber capacitors. The first to fourth diodes D1 to D4 may be the parasitic diodes of the respective first to fourth switches S1 to S4.

Figure 12:
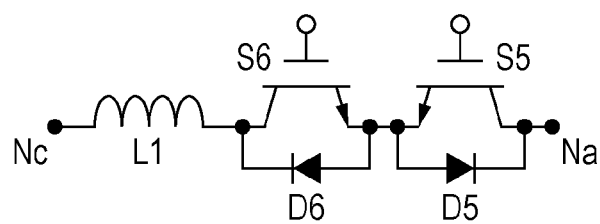
FIG. 12 is a diagram schematically illustrating a modification of auxiliary switches according to the first to fourth embodiments.

The fifth auxiliary switch S5 and the sixth auxiliary switch S6 may also have another connection arrangement, provided that they are disposed in a current path extending between the intermediate node Nc and the first node Na. FIG. 12 illustrates an example of connections of the fifth auxiliary switch S5, the sixth auxiliary switch S6, and the first auxiliary inductor L1 between the intermediate node Nc and the first node Na. In this case, although the number of reference potentials that are shared decreases compared with the switching power-supply device 100 in the first embodiment, it is possible to reliably reduce the switching loss, as in the power conversion apparatuses in the first to fourth embodiments. In addition, the fifth auxiliary switch S5 and the sixth auxiliary switch S6 illustrated in FIG. 12 may be implemented by one bidirectional switch. In other words, the arrangement may be such that one of the fifth auxiliary switch S5 and the sixth auxiliary switch S6 in any of the switching power-supply devices described in the first to fourth embodiments is eliminated and the other one may be used as a bidirectional switch. In this case, in the above description, the ON and OFF of the fifth auxiliary switch S5 may instead be read as ON and OFF of a first gate of the bidirectional switch, and the ON and OFF of the sixth auxiliary switch S6 may instead be read as ON and OFF of a second gate of the bidirectional switch. Similarly, the seventh auxiliary switch S7 and the eighth auxiliary switch S8 can also be replaced with a bidirectional switch.

In the present disclosure, the "bidirectional switch" may be a single bidirectional switch or may be circuitry including a plurality of switches. In the present disclosure, the "ON state of a bidirectional switch" refers to a state in which current flows through the bidirectional switch in either direction, and the "OFF state of a bidirectional switch" refers to a state in which no current flows through the bidirectional switch in either direction.

In addition to the above-described circuit configurations, the present disclosure also includes circuits that can realize the features of the present disclosure. For example, the present disclosure also includes a configuration in which an element, such as a switch (i.e., a transistor), a resistance element, or a capacitance element, is connected in series or in parallel with another element, so long as functions that are the same as or similar to those of the circuit configurations described above can be realized. In other words, the expression "connected" in the present disclosure is not limited to a case in which two terminals (nodes) are directly connected and also includes a case in which two terminals (nodes) are connected via an element, so long as the same or similar functions can be realized.

The power conversion apparatuses according to the present disclosure can be applied to DC-DC converters for use in electricity storage systems, vehicles, and so on.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A power conversion apparatus comprising:
a bridge circuit that converts an input direct-current voltage into a first alternating-current voltage, the bridge circuit including a first switch, a second switch connected in series with the first switch, a first capacitor connected in parallel with the first switch, and a second capacitor connected in parallel with the second switch;
a first auxiliary switch including a first end connected to a first node between the first switch and the second switch;
a first auxiliary inductor connected to a second end of the first auxiliary switch;
a control device that controls on and off of the first switch, the second switch, and the first auxiliary switch;
a transformer that converts the first alternating-current voltage into a second alternating-current voltage, the transformer including a primary winding connected to the bridge circuit and a secondary winding electromagnetically coupled with the primary winding;
a secondary-side inductor including a first end connected to the secondary winding;
a rectifier circuit that rectifies the second alternating-current voltage to generate a rectified voltage, the rectifier circuit connected to a second end of the secondary-side inductor;
a smoothing circuit that smooths the rectified voltage to generate an output voltage and an output current, the smoothing circuit being connected to the rectifier circuit; and
an output detection circuit that detects a value according to at least one of the output voltage and the output current,
wherein, if the detected value is smaller than or equal to a predetermined setting value, the control device
puts the first auxiliary switch into an on state in a first period from when the first switch is turned off until the second switch is turned on, and
puts the first auxiliary switch into an off state in a second period in which the first switch or the second switch is put into an on state; and
if the detected value exceeds the setting value, the control device maintains the first auxiliary switch in the off state.

2. The power conversion apparatus according to claim 1, wherein the bridge circuit comprises
a first arm including the first switch, the second switch, the first capacitor, and the second capacitor, and
a second arm including a third switch, a fourth switch connected in series with the third switch, a third capacitor connected in parallel with the third switch, and a fourth capacitor connected in parallel with the fourth switch;
wherein the power conversion apparatus further comprises
a second auxiliary switch including a first end connected to a second node between the third switch and the fourth switch, and
a second auxiliary inductor connected to a second end of the second auxiliary switch; and
wherein the control device further controls on and off of the third switch, the fourth switch, and the second auxiliary switch;
if the detected value is smaller than or equal to the setting value, the control device
puts the second auxiliary switch into an on state in a third period from when the third switch is turned off until the fourth switch is turned on, and
puts the second auxiliary switch into an off state in a fourth period in which the third switch or the fourth switch is put into an on state; and
if the detected value exceeds the setting value, the control device maintains the second auxiliary switch in the off state.

3. The power conversion apparatus according to claim 2, further comprising:
a voltage source that supplies the direct-current voltage to the bridge circuit;
a third auxiliary switch connected between the voltage source and the first auxiliary inductor; and
a fourth auxiliary switch connected between the voltage source and the second auxiliary inductor,
wherein the control device further controls on and off of the third auxiliary switch and the fourth auxiliary switch;

if the detected value is smaller than or equal to the setting value, the control device
puts the third auxiliary switch into an on state in a fifth period from when the second switch is turned off until the first switch is turned on,
puts the third auxiliary switch into an off state in the second period,
puts the fourth auxiliary switch into an on state in a sixth period from when the fourth switch is turned off until the third switch is turned on, and
puts the fourth auxiliary switch into an off state in the fourth period; and
if the detected value exceeds the setting value, the control device maintains the third auxiliary switch and the fourth auxiliary switch in the off state.

4. The power conversion apparatus according to claim 3, wherein the voltage source includes a first voltage-source capacitor and a second voltage-source capacitor connected in series with the first voltage-source capacitor; and
the third auxiliary switch and the fourth auxiliary switch are connected to an intermediate node between the first voltage-source capacitor and the second voltage-source capacitor.

5. The power conversion apparatus according to claim 3, wherein a reference terminal of the first switch and a reference terminal of the first auxiliary switch have equal potentials;
a reference terminal of the third switch and a reference terminal of the second auxiliary switch have equal potentials;
a reference terminal of the second switch and a reference terminal of the fourth switch have equal potentials; and
a reference terminal of the third auxiliary switch and a reference terminal of the fourth auxiliary switch have equal potentials.

6. The power conversion apparatus according to claim 3, wherein the first switch, the second switch, the third switch, the fourth switch, the first auxiliary switch, the second auxiliary switch, the third auxiliary switch, and the fourth auxiliary switch each comprise insulated gate bipolar transistors or metal oxide semiconductor field effect transistors.

7. The power conversion apparatus according to claim 2, further comprising:
a voltage source that supplies the direct-current voltage to the bridge circuit; and
a third auxiliary switch connected between the voltage source and the first auxiliary inductor,
wherein the second auxiliary inductor is connected between the second auxiliary switch and the third auxiliary switch; and
wherein the control device further controls on and off of the third auxiliary switch;
if the detected value is smaller than or equal to the setting value, the control device
puts the third auxiliary switch into the on state in a fifth period from when the second switch is turned off until the first switch is turned on and in a period from when the fourth switch is turned off until the third switch is turned on, and
puts the third auxiliary switch into the off state in a sixth period in which the first switch or the second switch is put into the on state and the third switch or the fourth switch is put into the on state; and if the detected value exceeds the setting value, the control device maintains the third auxiliary switch in the off state.

8. The power conversion apparatus according to claim 7, wherein the voltage source includes a first voltage-source capacitor and a second voltage-source capacitor connected in series with the first voltage-source capacitor; and
the third auxiliary switch is connected to an intermediate node between the first voltage-source capacitor and the second voltage-source capacitor.

9. The power conversion apparatus according to claim 2, wherein a reference terminal of the first switch and a reference terminal of the first auxiliary switch have equal potentials;
a reference terminal of the third switch and a reference terminal of the second auxiliary switch have equal potentials; and
a reference terminal of the second switch and a reference terminal of the fourth switch have equal potentials.

10. The power conversion apparatus according to claim 2, wherein the control device controls on and off of the first switch, the second switch, the third switch, and the fourth switch by phase shift control.

11. The power conversion apparatus according to claim 1, wherein the first auxiliary switch is a first bidirectional switch; and
wherein, if the detected value is smaller than or equal to the predetermined setting value, the control device
puts one of two gates of the first bidirectional switch into an on state in the first period,
puts the other of the two gates of the first bidirectional switch into an on state in a third period from when the second switch is turned off until the first switch is turned on, and
puts the two gates of the first bidirectional switch into an off state in the second period.

12. The power conversion apparatus according to claim 11,
wherein the bridge circuit comprises:
a first arm including the first switch, the second switch, the first capacitor, and the second capacitor; and
a second arm including a third switch, a fourth switch connected in series with the third switch, a third capacitor connected in parallel with the third switch, and a fourth capacitor connected in parallel with the fourth switch,
wherein the power conversion apparatus further comprises:
a second bidirectional switch including a first end connected to a second node between the third switch and the fourth switch, and
a second auxiliary inductor connected to a second end of the second auxiliary switch; and
wherein the control device further controls on and off of the third switch, the fourth switch, and the second bidirectional switch, and
if the detected value is smaller than or equal to the setting value, the control device
puts one of two gates of the second bidirectional switch into an on state in a fourth period from when the third switch is turned off until the fourth switch is turned on, and
puts the other of the two gates of the second bidirectional switch into the on state in a fifth period from when the fourth switch is turned off until the third switch is turned on.

13. The power conversion apparatus according to claim 12,
wherein the control device controls on and off of the first switch, the second switch, the third switch, and the fourth switch by phase shift control.

14. The power conversion apparatus according to claim 1, wherein, in the first period, at least the first auxiliary inductor, the first capacitor, and the second capacitor cause resonance current flowing therethrough to be generated.

15. The power conversion apparatus according to claim 1, wherein, the secondary-side inductor accumulates energy when current flows therethrough, and then causes resonance current flowing through the first capacitor and the second capacitor to be generated using the energy in a period in which the first switch and the second switch are in the off state.

16. The power conversion apparatus according to claim 1, wherein a reference terminal of the first switch and a reference terminal of the first auxiliary switch have equal potentials.

17. A power conversion apparatus comprising:
a bridge circuit that includes
    a first arm including a first switch, a second switch connected in series with the first switch, a first capacitor connected in parallel with the first switch, and a second capacitor connected in parallel with the second switch, and
    a second arm including a third switch, a fourth switch connected in series with the third switch, a third capacitor connected in parallel with the third switch, and a fourth capacitor connected in parallel with the fourth switch;
a voltage source that supplies a direct-current voltage to the bridge circuit;
a first bidirectional switch disposed in a first current path extending between the voltage source and a first node between the first switch and the second switch, the first bidirectional switch including at least one switch;
a first auxiliary inductor disposed in the first current path, the first auxiliary inductor connected in series with the at least one switch included in the first bidirectional switch;
a second bidirectional switch disposed in a second current path extending between the voltage source and a second node between the third switch and the fourth switch, the second bidirectional switch including at least one switch;
a second auxiliary inductor disposed in the second current path, the second auxiliary inductor connected in series with the at least one switch included in the second bidirectional switch;
a control device that controls on and off of the first switch, the second switch, the third switch, the fourth switch, the first bidirectional switch, and the second bidirectional switch;
a transformer that converts a first alternating-current voltage into a second alternating-current voltage, the transformer including a primary winding connected to the bridge circuit and a secondary winding electromagnetically coupled with the primary winding;
a secondary-side inductor including a first end connected to the secondary winding;
a rectifier circuit that rectifies the second alternating-current voltage to generate a rectified voltage, the rectifier connected to a second end of the secondary-side inductor;
a smoothing circuit that smooths the rectified voltage to generate an output voltage and an output current, the smoothing circuit connected to the rectifier circuit; and
an output detection circuit that detects a value according to at least one of the output voltage and the output current,
wherein, if the detected value is smaller than or equal to a predetermined setting value, the control device
    puts the first bidirectional switch into an on state in a first period in which the first switch and the second switch are in an off state,
    puts the first bidirectional switch into an off state in a second period in which the first switch or the second switch is in an on state,
    puts the second bidirectional switch into an on state in a third period in which the third switch and the fourth switch are in an off state, and
    puts the second bidirectional switch into an off state in a fourth period in which the third switch or the fourth switch is in an on state; and
if the detected value exceeds the setting value, the control device maintains at least one of the first bidirectional switch and the second bidirectional switch in the off state.

18. A power conversion apparatus, comprising:
a bridge circuit including
    a first arm including a first switch, a second switch connected in series with the first switch, a first capacitor connected in parallel with the first switch, and a second capacitor connected in parallel with the second switch, and
    a second arm including a third switch, a fourth switch connected in series with the third switch, a third capacitor connected in parallel with the third switch, and a fourth capacitor connected in parallel with the fourth switch;
a voltage source that supplies a direct-current voltage to the bridge circuit;
a first auxiliary switch including a first end connected to a first node between the first switch and the second switch;
a first auxiliary inductor connected to a second end of the first auxiliary switch;
a second auxiliary switch including a first end connected to a second node between the third switch and the fourth switch;
a second auxiliary inductor connected to a second end of the second auxiliary switch;
a third auxiliary switch connected between the voltage source and a node between the first auxiliary inductor and the second auxiliary inductor;
a control device that controls on and off of the first switch, the second switch, the third switch, the fourth switch, the first auxiliary switch, the second auxiliary switch, and the third auxiliary switch;
a transformer that converts a first alternating-current voltage into a second alternating-current voltage, the transformer including a primary winding connected to the bridge circuit and a secondary winding electromagnetically coupled with the primary winding;
a secondary-side inductor including a first end connected to the secondary winding;
a rectifier circuit that rectifies the second alternating-current voltage to generate a rectified voltage, the rectifier circuit connected to a second end of the secondary-side inductor;

a smoothing circuit that smooths the rectified voltage to generate an output voltage and an output current, the smoothing circuit connected to the rectifier circuit; and an output detection circuit that detects a value according to at least one of the output voltage and the output current from the smoothing circuit, wherein, if the detected value is smaller than or equal to a predetermined setting value, the control device puts the first auxiliary switch or the third auxiliary switch into an on state in a first period in which the first switch and the second switch are in an off state, puts the first auxiliary switch and the third auxiliary switch into an off state in a second period in which the first switch or the second switch is in an on state, puts the second auxiliary switch or the third auxiliary switch into an on state in a third period in which the third switch and the fourth switch are in an off state, and puts the second auxiliary switch and the third auxiliary switch into an off state in a fourth period in which the third switch or the fourth switch is in an on state; and if the detected value exceeds the setting value, the control device maintains at least one of the first auxiliary switch, the second auxiliary switch, and the third auxiliary switch in the off state.

* * * * *